US009261906B2

(12) United States Patent
Arima et al.

(10) Patent No.: US 9,261,906 B2
(45) Date of Patent: Feb. 16, 2016

(54) INFORMATION TERMINAL APPARATUS AND INFORMATION PROCESSING METHOD

(71) Applicant: SONY CORPORATION, Minato-ku (JP)

(72) Inventors: Kiyokuni Arima, Nagano (JP); Yujin Morisawa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 28 days.

(21) Appl. No.: 14/370,820

(22) PCT Filed: Jan. 23, 2013

(86) PCT No.: PCT/JP2013/000309
§ 371 (c)(1),
(2) Date: Jul. 7, 2014

(87) PCT Pub. No.: WO2013/114820
PCT Pub. Date: Aug. 8, 2013

(65) Prior Publication Data
US 2015/0002998 A1  Jan. 1, 2015

(30) Foreign Application Priority Data

Feb. 3, 2012  (JP) .................................. 2012-022540

(51) Int. Cl.
G06F 1/16  (2006.01)
G09G 5/00  (2006.01)
G06F 3/02  (2006.01)
G06F 3/041  (2006.01)
G06F 9/44  (2006.01)

(52) U.S. Cl.
CPC .............. *G06F 1/162* (2013.01); *G06F 1/1615* (2013.01); *G06F 1/1616* (2013.01); *G06F 1/1618* (2013.01); *G06F 1/1637* (2013.01);
(Continued)

(58) Field of Classification Search
CPC ... G06F 1/1615; G06F 1/1616; G06F 1/1618; G06F 1/162; G06F 1/1675; G06F 1/1677
USPC ............... 361/679.01–679.3, 679.55–679.59; 345/156, 157, 168, 169, 905
See application file for complete search history.

(56) References Cited

U.S. PATENT DOCUMENTS 5,900,848 A    5/1999  Haneda et al.
2005/0128695 A1*  6/2005  Han ........................ G06F 1/162
                                                   361/679.55
(Continued)

FOREIGN PATENT DOCUMENTS

EP    0 807 879 A2    11/1997
EP    0807879 A2 *   11/1997  .............. G06F 1/162
(Continued)

OTHER PUBLICATIONS

International Search Report issued May 22, 2013 in PCT/JP2013/000309.

*Primary Examiner* — Nidhi Thaker
(74) *Attorney, Agent, or Firm* — Oblon, McClelland, Maier & Neustadt, L.L.P.

(57) ABSTRACT

An apparatus includes a first body, a second body, and a linking mechanism. The first body includes an input unit on an input side of the first body. The second body includes a display on a display side of the second body. The linking mechanism is configured to link the first body and the second body such that the first body and the second body can be switched between four different modes.

17 Claims, 21 Drawing Sheets

(52) U.S. Cl.
CPC ............ G06F 1/1675 (2013.01); G06F 1/1681 (2013.01); G06F 3/0412 (2013.01); G06F 9/4421 (2013.01)

(56) References Cited

U.S. PATENT DOCUMENTS

2007/0058329 A1* 3/2007 Ledbetter ............... F16M 11/04
361/679.06
2007/0205981 A1* 9/2007 Stone, III ................. G06F 1/162
345/156
2011/0194238 A1* 8/2011 Song ..................... G06F 1/1616
361/679.08

FOREIGN PATENT DOCUMENTS

EP         2 397 929   A1      12/2011
EP         2397929     A1  *   12/2011    ............. G06F 1/162

* cited by examiner

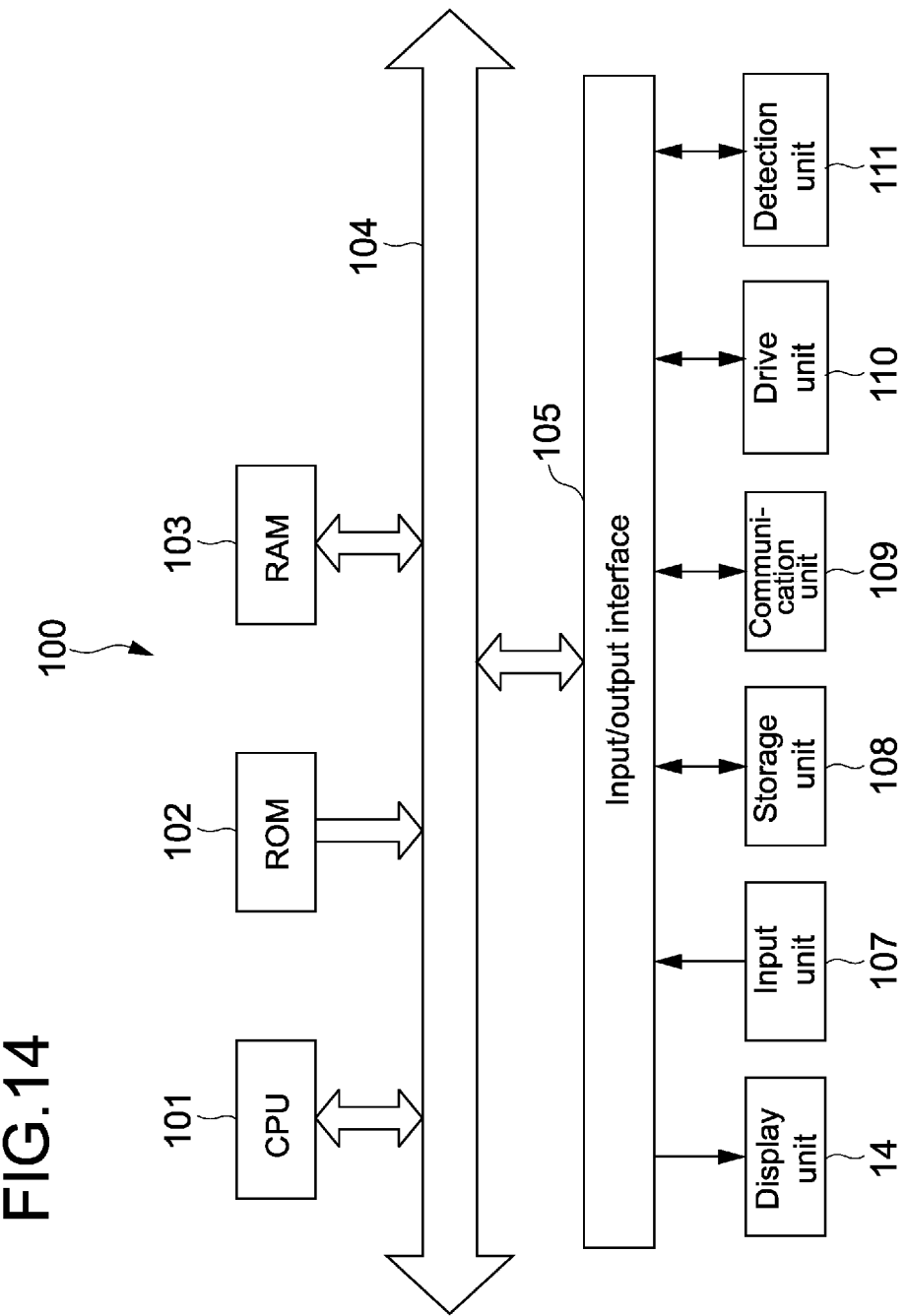

INFORMATION TERMINAL APPARATUS AND INFORMATION PROCESSING METHOD

TECHNICAL FIELD

The present technology relates to an information terminal apparatus such as a notebook PC (personal computer), and an information processing method therefor.

BACKGROUND ART

Patent Literature 1 describes a mobile apparatus including a first chassis (10) having operation keys, a second chassis (20) having a display panel, and coupling members (30) and (40) configured to couple the first chassis (10) and the second chassis (20) to each other. The coupling member (30) is coupled turnably to the first chassis (10) and the second chassis (20) respectively by hinge units (50) and (60) provided at both ends of the coupling member (30) (the same applies to the coupling member (40)) (for example, refer to paragraphs [0013] to [0015] of the specification and FIGS. 2 and 3 of Patent Literature 1).

CITATION LIST

Patent Literature

PTL 1: Japanese Patent Application Laid-open No. 2010-65840

SUMMARY

Technical Problem

In recent years, information terminal apparatuses such as the above-mentioned mobile apparatus have been used in more diverse ways. In view of such a circumstance, it is necessary to meet needs corresponding to the diversity.

It is desirable to provide an information terminal apparatus used in a devised way and an information processing method therefor.

Solution to Problem

An apparatus includes a first body, a second body, and a linking mechanism. The first body includes an input unit on an input side of the first body. The second body includes a display on a display side of the second body. The linking mechanism is configured to link the first body and the second body such that the first body and the second body can be switched between four different modes: a first mode being where the first body and second body are arranged parallel to each other with the input side facing an opposite side of the second body from the display side, a second mode where the first body and the second body are arranged parallel to each other with the input side facing the display side, a third mode where the second body is rotated around a back edge of the first body and the display side faces the input side, and a fourth mode where the second body is arranged above the input side of the first body such that an edge of the second body is adjacent to a portion of the input side of the first body between a front edge and the back edge of the first body.

Advantageous Effect of Invention

As described above, according to the embodiments of the present technology, there can be provided an information terminal apparatus used in a devised way and an information processing method therefor.

BRIEF DESCRIPTION OF DRAWINGS

FIG. 1 is a perspective view of a notebook PC (personal computer) as an information terminal apparatus (electronic computer) according to an embodiment of the present technology.

FIG. 2 is a perspective view of the PC under a state in which a display body is closed with respect to a main body.

FIG. 3 is a perspective view of the PC under a state in which a display unit of the display body is directed to an outside.

FIG. 4 is a side view of the PC in the closed mode illustrated in FIG. 2.

FIG. 5 is a side view of the PC in the tablet mode illustrated in FIG. 3.

FIG. 6 is a side view of the PC under a state in which a parallel linking mechanism has been actuated to maintain a posture in which the display body is inclined with respect to a horizontal plane (or perpendicular axis).

FIG. 7 is a perspective view of the PC viewed from the back thereof, mainly illustrating the parallel linking mechanism.

FIG. 8 is a perspective view illustrating a vicinity of shoulder portions of a first arm and a second arm of the parallel linking mechanism from an inside thereof.

FIG. 9 illustrates a clamshell opening/closing operation.

FIG. 10 illustrates, in an X-axis direction, a vicinity of the slide shaft of the PC under a state in which the clamshell opening/closing operation can be performed.

[FIG. 11]

FIG. 13 is a perspective view of the PC in the state illustrated in FIG. 11A.

[FIG. 14] FIG. 14 is a block diagram showing an electrical hardware configuration of the PC.

[FIG. 15]

[FIG. 16]

[FIG. 17]

[FIG. 18]

[FIG. 19]

[FIG. 20]

[FIG. 21]

[FIG. 22]

[FIG. 23]

FIG. 24 is a perspective view viewed from diagonally right above the front of the electronic computer illustrated in FIG. 15, in which the display body of the electronic computer is in still another mode (tablet mode).

DESCRIPTION OF EMBODIMENTS

In the following, description is made of embodiments of the present technology with reference to the drawings.

(Configuration of Information Terminal Apparatus)

Figure 1:
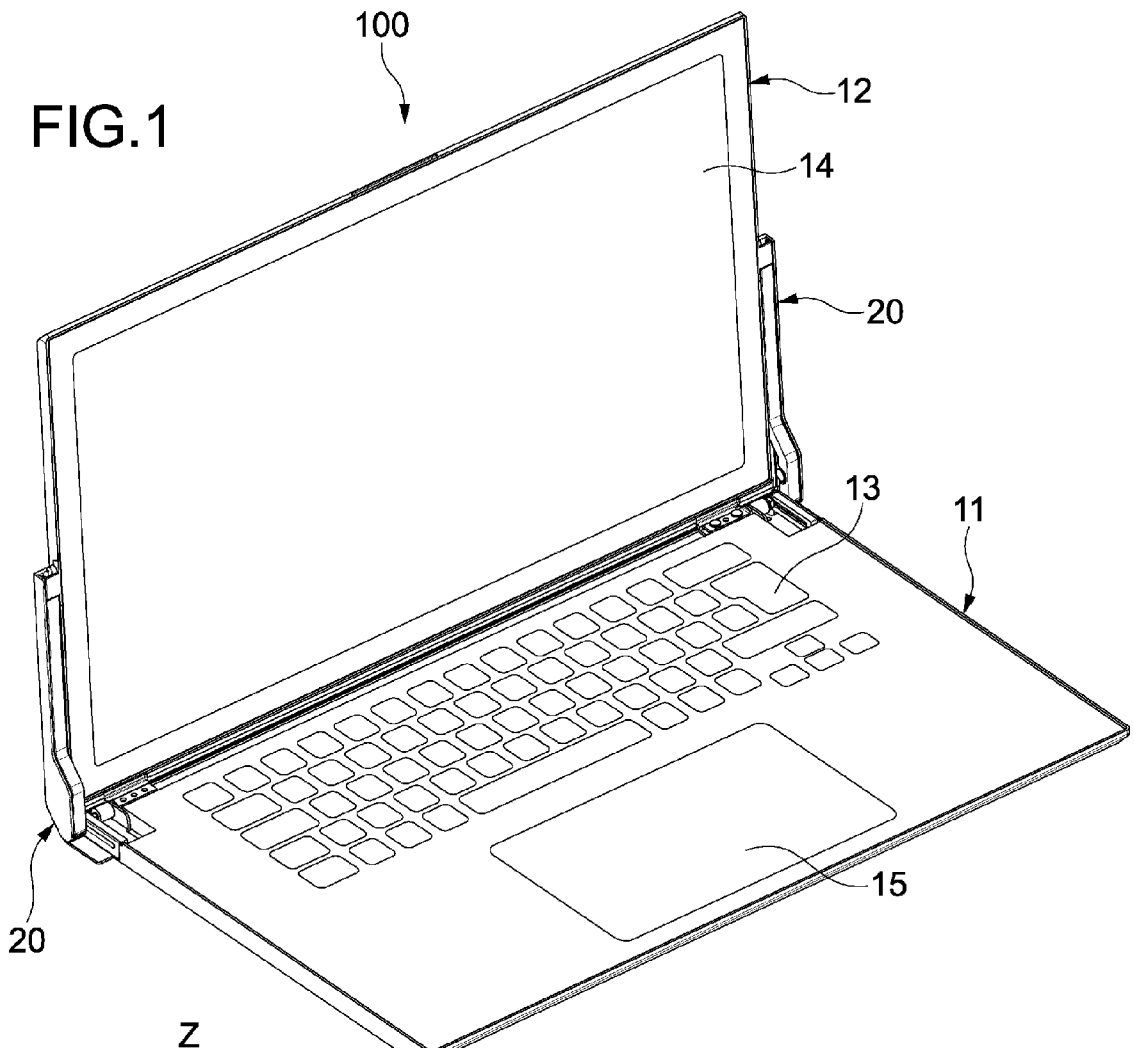
[FIG. 1]

FIG. 1 is a perspective view of a notebook (clamshell) PC (personal computer) as an information terminal apparatus (electronic computer) according to an embodiment of the present technology.

A PC 100 includes a main body (first body) 11, a display body (second body) 12, and a parallel linking mechanism (connecting member) 20 configured to connect the main body 11 and the display body 12 to each other. The main body 11 and the display body 12 each schematically have a flat-plate and rectangular parallelepiped shape. The parallel linking mechanism 20 includes a pair of parallel linking mechanisms 20 provided on both sides of the PC 100.

Typically, the main body 11 includes, as operation input portions, a keyboard 13 and a touch pad 15. A case of the main body 11 incorporates a main circuit board equipped with circuit chips such as a CPU (central processing unit) (refer to FIG. 14), and the like. On a display side of the display body 12, there is provided a display unit 14. The display unit 14 is of, for example, a touch panel type. The keyboard 13 and the touch pad 15 are illustrated only in FIGS. 1 and 13.

Communication between the main body 11 and the display body 12 is performed via cables and flexible circuit boards (not shown). In this case, such cables may be arranged, for example, within a cover (not shown) covering the linking mechanism. Alternatively, the main body 11 and the display body 12 may communicate with each other, for example, by using wireless communication techniques in related art, such as short-range wireless communication.

Figure 2:
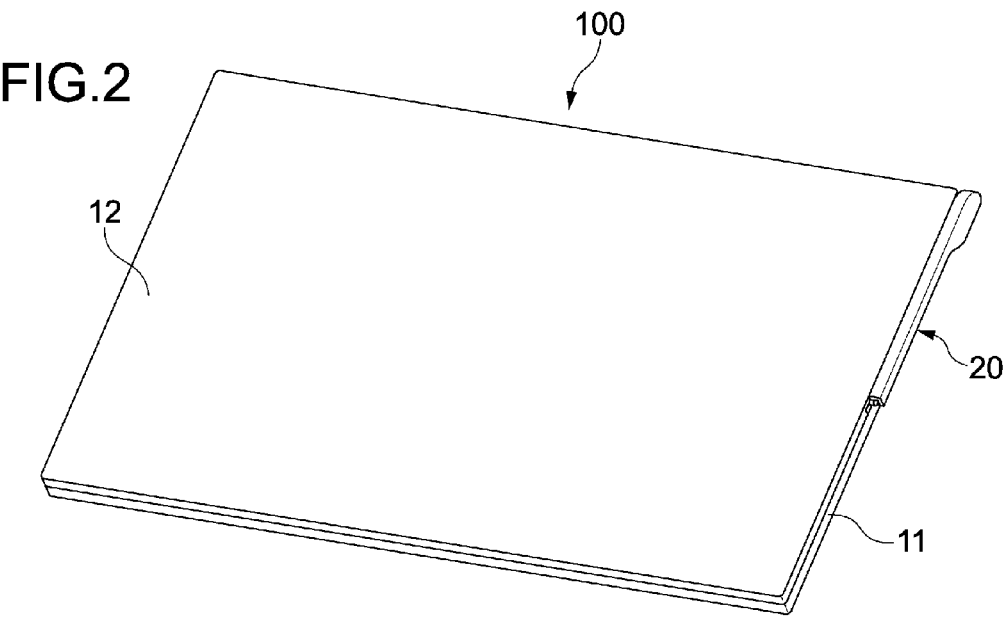
[FIG. 2]

FIG. 2 is a perspective view of the PC 100 under a state in which the display body 12 is closed with respect to the main body 11. In the following, the state of the PC illustrated in FIG. 2 is referred to as a closed mode. In the closed mode, the main body 11 and the display body 12 are overlaid on each other in a manner that an opposite side with respect to the display side of the display body 12 is directed to an outside of the PC 100.

Figure 3:
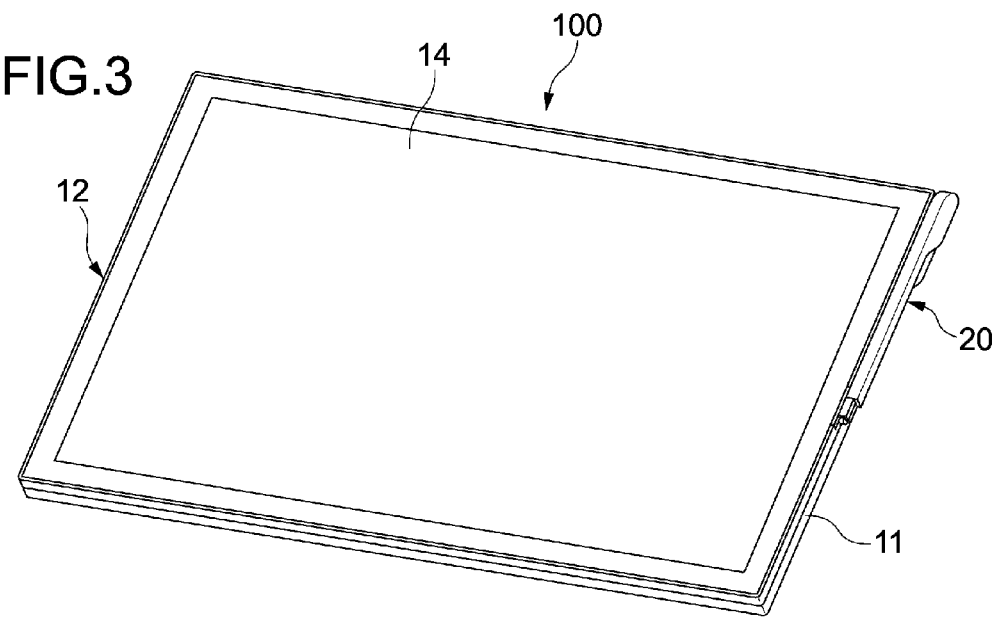
[FIG. 3]

FIG. 3 is a perspective view of the PC 100 under a state in which the display unit 14 of the display body 12 is directed to the outside. In the following, the state of the PC illustrated in FIG. 3 is referred to as a tablet mode. In the tablet mode, the main body 11 and the display body 12 are overlaid on each other in a manner that the display side of the display body 12 is directed to the outside of the PC 100.

Figure 4:
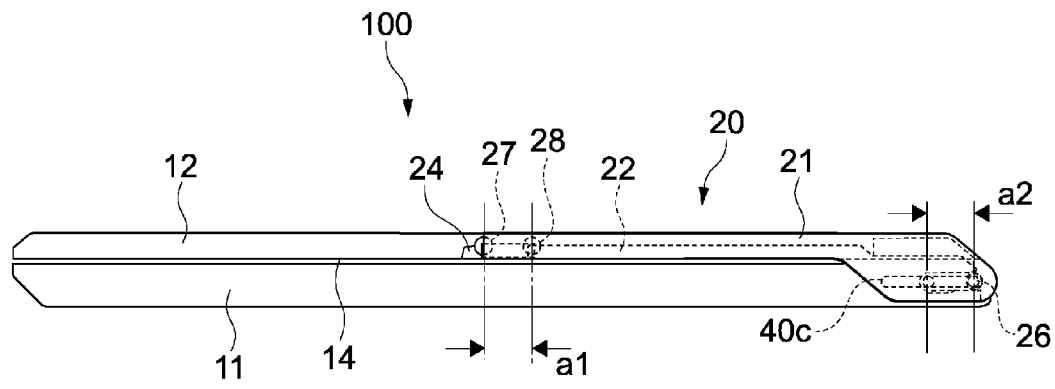
[FIG. 4]
Figure 5:
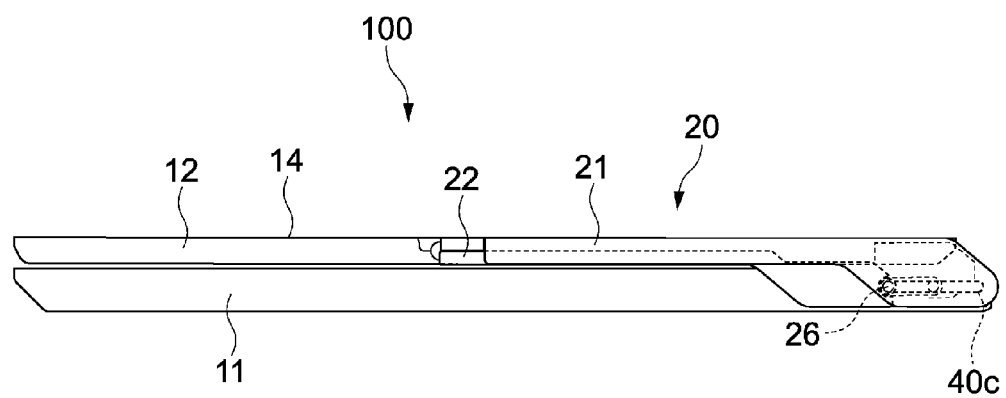
[FIG. 5]

FIG. 4 is a side view of the PC 100 in the closed mode illustrated in FIG. 2. FIG. 5 is a side view of the PC 100 in the tablet mode illustrated in FIG. 3.

As described above, the PC 100 is switched between the closed mode and the tablet mode by turning the display body 12 at substantially 180 deg with respect to the main body 11.

In the following, for the sake of simplification of description, a plane in which the main body 11 is placed is referred to as a horizontal plane (X-Y plane), and an axis perpendicular to this horizontal plane is referred to as a perpendicular axis (Z-axis). Further, in a Y-axis direction of the main body 11 of the PC 100, the touch pad 15 side is referred to as the front (front side), and the keyboard 13 side is referred to as the back (back side). In addition, in the following, description is made of only one of the parallel linking mechanisms 20 unless it is necessary to make description of both the parallel linking mechanisms 20.

Figure 6:
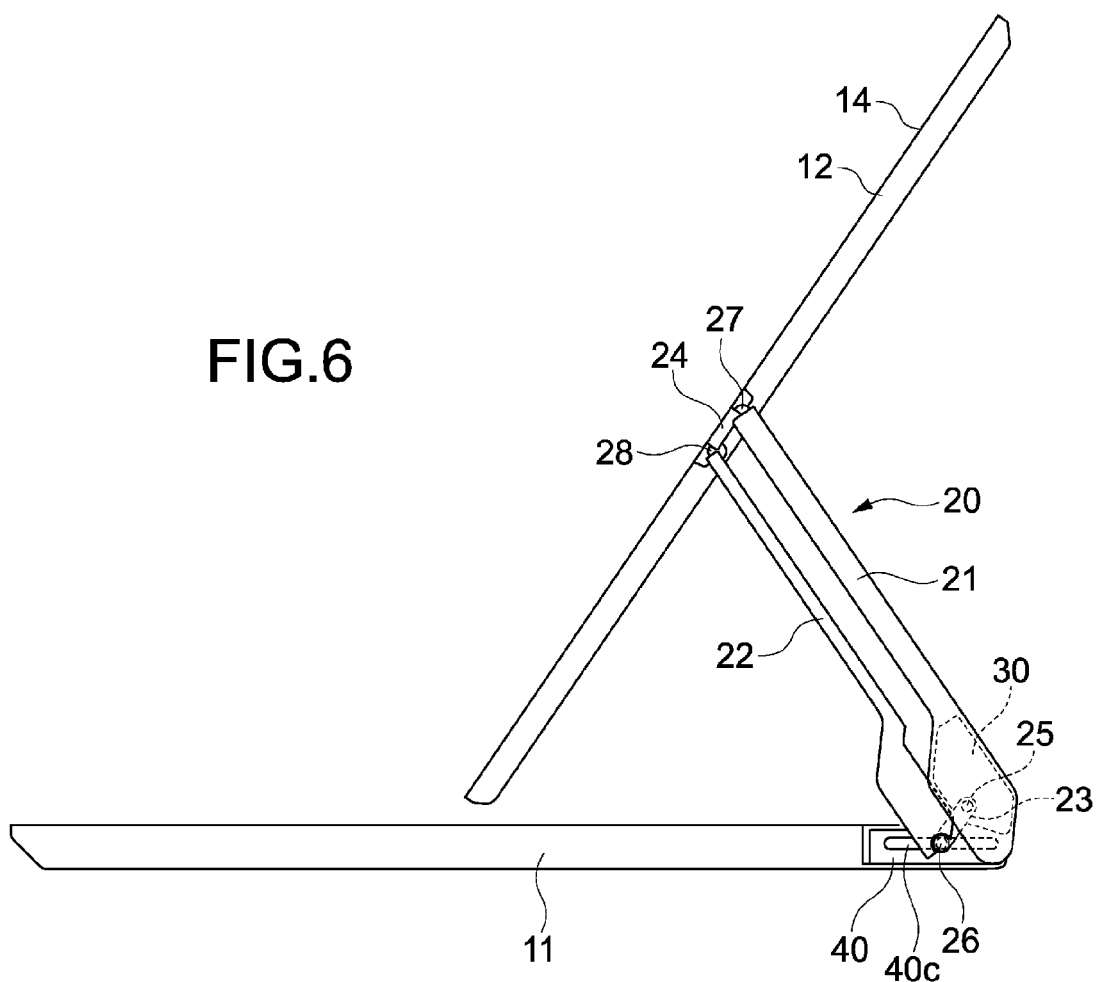
[FIG. 6]
Figure 7:
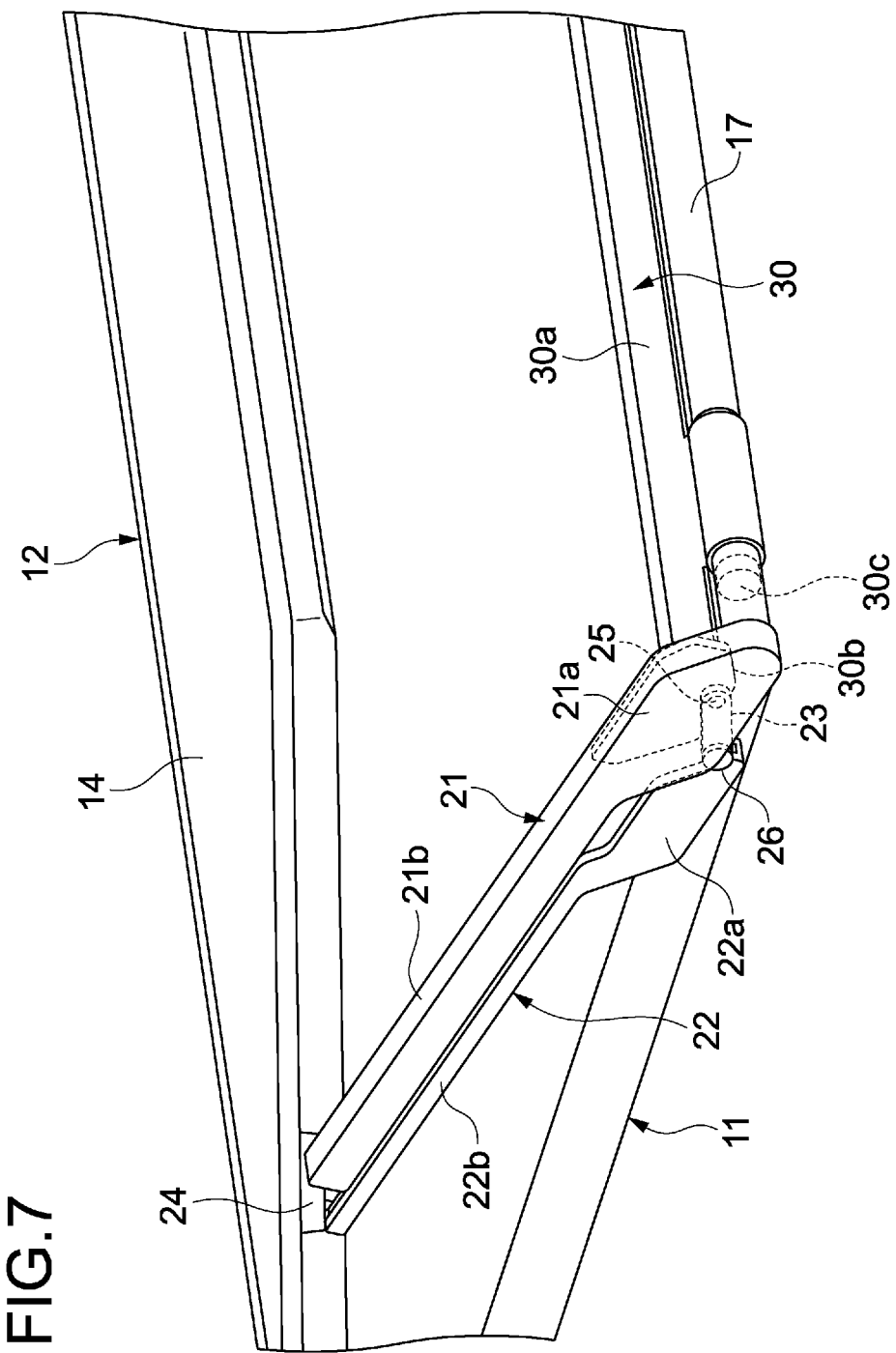
[FIG. 7]

FIG. 6 is a side view of the PC 100 under a state in which the parallel linking mechanism 20 has been actuated to maintain a posture in which the display body 12 is inclined with respect to the horizontal plane (or perpendicular axis). FIG. 7 is a perspective view of the PC 100 viewed from the back thereof, mainly illustrating the parallel linking mechanism 20.

As illustrated in FIG. 7, a shaft attachment portion 17 is formed along a rear end portion of the main body 11, and a rotary base frame 30 is connected turnably to the shaft attachment portion 17.

The rotary base frame 30 includes a hinge shaft 30c to be a rotary shaft, a bar portion 30a provided in parallel with the hinge shaft 30c, and a pair of flat-plate attachment portions 30b provided at both ends of the bar portion 30a. The hinge shaft 30c is connected to the shaft attachment portion 17 of the main body 11 while receiving torque (subjected to friction). As described below, first arms 21 of both the parallel linking mechanisms 20 are respectively coupled to the attachment portions 30b of the rotary base frame 30. In this case, the rotary base frame 30 functions as a coupling member.

The parallel linking mechanisms 20 each includes the first arm 21, a second arm 22, and a link arm 23 configured to link the first arm 21 and the second arm 22 in parallel with each other.

As illustrated in FIG. 7, the first arm 21 includes a shoulder portion 21a and an arm portion 21b provided to extend from the shoulder portion 21a. The second arm 22 also has a shape similar to that of the above-mentioned first arm 21, that is, includes a shoulder portion 22a and an arm portion 22b. As described above, the attachment portion 30b of the rotary base frame 30 is connected to the shoulder portion 21a of the first arm 21. With this, the first arm 21 is turnable integrally with the rotary base frame 30 about the hinge shaft 30c of the rotary base frame 30.

The link arm 23 is connected, at one end thereof, turnably to the first arm 21 through intermediation of a connecting shaft 25, and, at another end thereof, turnably to the second arm 22 through intermediation of a slide shaft 26.

Figure 8:
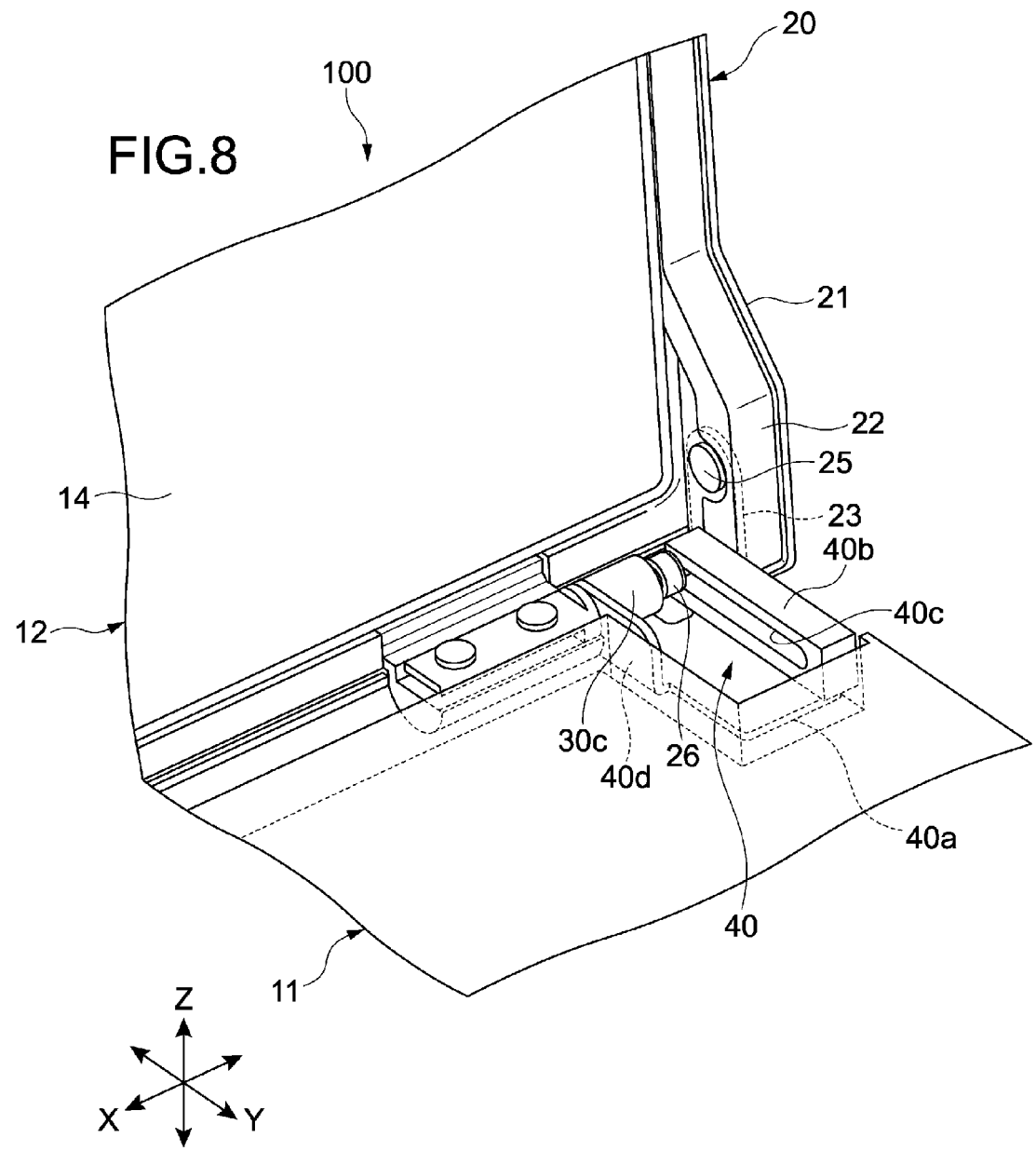
[FIG. 8]

FIG. 8 is a perspective view illustrating a vicinity of the shoulder portions 21a and 22a of the first arm 21 and the second arm 22 of the parallel linking mechanism 20 from an inside thereof. FIG. 8 does not illustrate the rotary base frame 30. As illustrated in FIGS. 6 to 8, from the outside to the inside of the PC 100, the shoulder portion 21a of the first arm 21, the shoulder portion 22a of the second arm 22, the link arm 23, and the attachment portion 30b of the rotary base frame 30 are arranged in this order.

At a corner portion of the main body 11, there is provided a fixing base 40. The fixing base 40 is fixed to the main body 11, and includes a bottom plate 40a and a guide portion 40b formed on an outside in the X-axis direction of the bottom plate 40a. The slide shaft 26 is connected slidably to the guide portion 40b. In other words, the guide portion 40b guides a slide of the slide shaft 26. For example, the guide portion 40b has an oblong hole 40c formed, for example, in a Y-axis direction so that the slide shaft 26 is arranged slidably within the oblong hole 40c.

On an inside in the X-axis direction of the bottom plate 40a of the fixing base 40, there is provided upright a perpendicular plate 40d. The above-mentioned hinge shaft 30c of the rotary base frame 30 is connected to the perpendicular plate 40d (refer to FIGS. 7 and 8).

As illustrated in FIGS. 6 and 7, the respective arm portions 21b and 22b of the first arm 21 and the second arm 22 are connected turnably to the display body 12 through intermediation of respective shaft portions at distal ends of the arm portions 21b and 22b. For example, on side surfaces of the display body 12, there are respectively attached side members 24 configured to connect the arm portions 21b and 22b. The side members 24 are each attached to the display body 12 in a manner that a longitudinal direction of the side members 24 corresponds to a longitudinal direction of the side surfaces of the display body 12. In other words, such attachment enables the link arm 23 and a display surface of the display body 12 to be parallel with each other.

As illustrated in FIG. 4, a clearance a1 between two shafts 27 and 28 of each of the side members 24 and a clearance a2 between the connecting shaft 25 and the slide shaft 26 are designed to be substantially equal to each other. In other words, the first arm 21, the second arm 22, the link arm 23, and the side member 24 form a quadrangular shape of the parallel linking mechanism 20. For example, when the quadrangular shape of the parallel linking mechanism 20 becomes a rectangular shape, the arm portions 21b and 22b of the first arm 21 and the second arm 22 forms an angle of 45 deg with respect to the horizontal plane. In this case, the display surface of the display body 12 is perpendicular to the arm portions 21b and 22b, and also forms an angle of 45 deg with respect to the horizontal plane.

At least the first arm 21 is formed to have a substantially L-shape in cross-section perpendicular to a longitudinal direction thereof, and the second arm 22 is formed to have a substantially U-shape (or square-cornered C-shape) in cross-section perpendicular to a longitudinal direction thereof (refer to FIG. 8). The second arm 22 is formed to have a size in cross-section smaller than a size in cross-section of the first arm 21. Thus, as illustrated in FIGS. 4 and 5, under a state in which the first arm 21, the second arm 22, the link arm 23, and the side member 24 are parallel with each other, the second arm 22 is arranged within the first arm 21 located on an outer side of the second arm 22. Note that the second arm 22 may be formed to have an L-shape in cross-section similar to the sectional shape of the first arm 21.

Through intermediation of the four shafts provided to the parallel linking mechanism 20 (slide shaft 26, connecting shaft 25, and shaft portions 27 and 28), the parallel linking mechanism 20 is connected to the main body 11 and the display body 12 with predetermined torque (frictional force). Thus, with this torque, the PC 100 can maintain any posture to be assumed by the display body 12 with respect to the main body 11.

However, as described below, the four shafts of the parallel linking mechanism 20 need not have such torque which enables the display body 12 to be maintained in any of the postures with respect to the main body 11. Alternatively, as described below, a mechanism such as a stopper may be provided to enable the display body 12 to be maintained in a posture as illustrated in FIG. 6.

In the closed mode illustrated in FIG. 4, the slide shaft 26 is positioned at a slide rear end 40f (first slide end) (refer to FIG. 10) as a rear end of the oblong hole 40c of the guide portion 40b. The slide shaft 26 positioned at the slide rear end 40f is aligned with the hinge shaft 30c of the rotary base frame 30. When the slide shaft 26 is positioned at the slide rear end 40f, as in the normal notebook PC 100, the display body 12 is in a state of being openable/closable with respect to the main body 11. In the following, this state is conveniently referred to as a "clamshell mode", and an opening/closing operation of the display body 12 in such a state is referred to as a clamshell opening/closing operation.

Meanwhile, in the tablet mode illustrated in FIG. 5, the slide shaft 26 is positioned at a slide front end 40e (second slide end) as a front end of the oblong hole 40c of the guide portion 40b.

(Mechanical Operations of Information Terminal Apparatus)

Next, description is made of mechanical operations of the PC 100 configured as described above. As the mechanical operations of this PC 100, two opening/closing operations of the above-mentioned clamshell opening/closing operation and a tablet opening/closing operation are performed.

<Clamshell Opening/Closing Operation>

The closed mode refers to a mode in which the first arm 21, the second arm 22, and the link arm 23 of the parallel linking mechanism 20 are parallel with each other and the slide shaft 26 is positioned at the slide rear end 40f of the guide portion 40b (refer to FIGS. 2 and 4). In this state, the PC 100 can perform the above-mentioned clamshell opening/closing operation.

Figure 9:
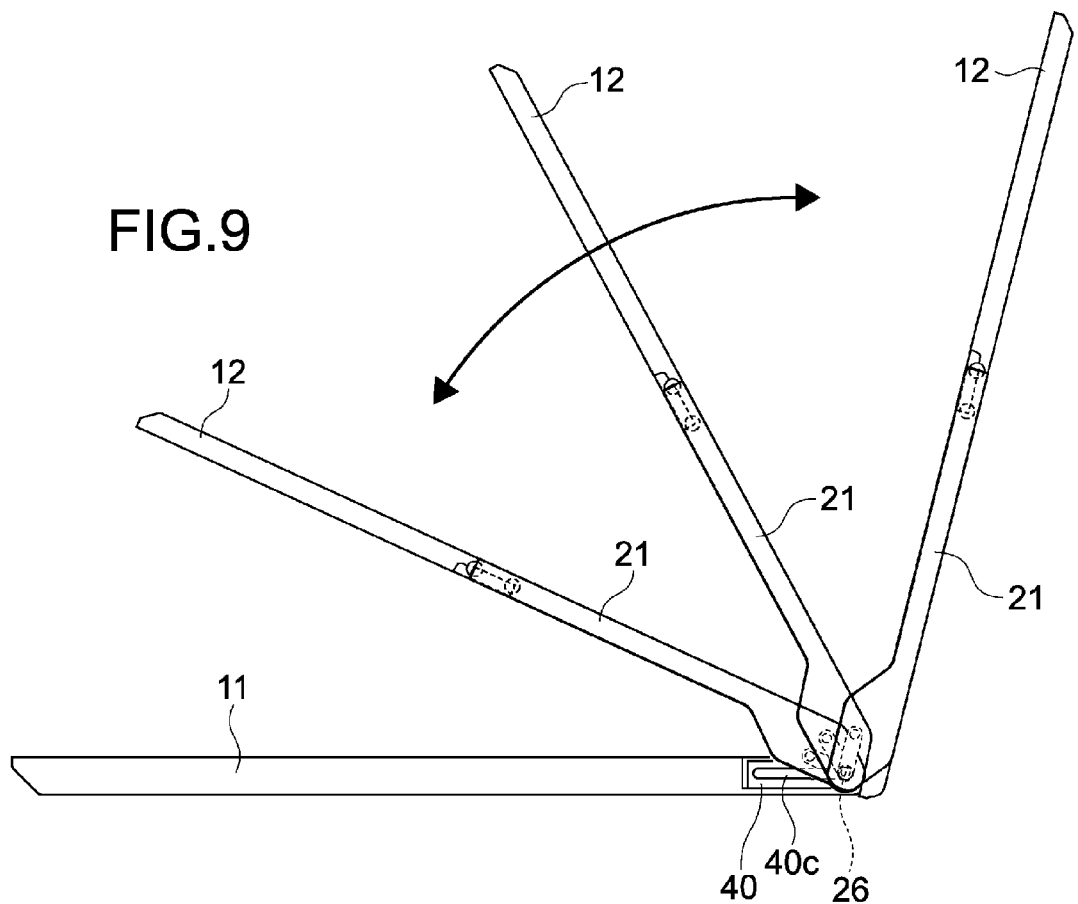
[FIG. 9]
Figure 10:
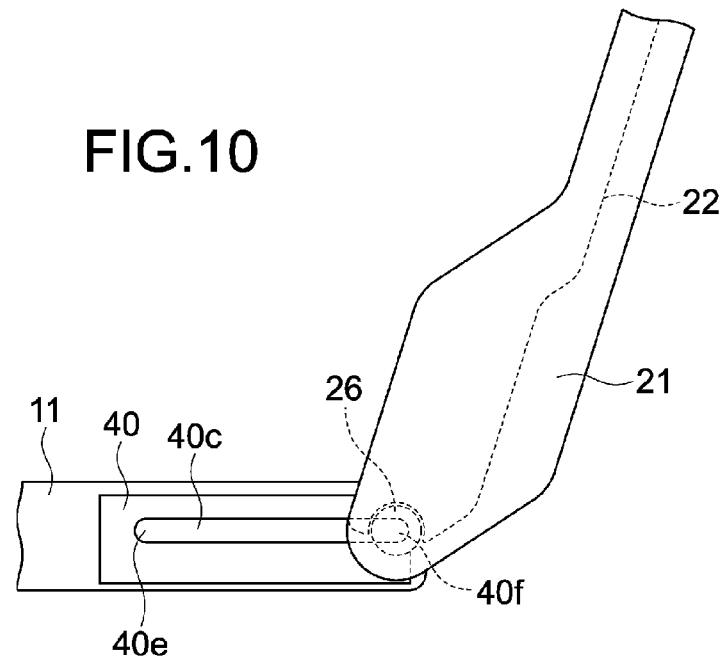
[FIG. 10]

FIG. 9 illustrates the clamshell opening/closing operation. Also as illustrated in FIG. 10, the display body 12, the parallel linking mechanism 20, and the rotary base frame 30 are moved integrally with each other under a state in which the first arm 21, the second arm 22, and the link arm 23 are maintained to be parallel with each other and the slide shaft 26 is aligned with the hinge shaft 30c. In other words, by the clamshell opening/closing operation, the display body 12 and the parallel linking mechanism 20 are turned about the hinge shaft 30c of the rotary base frame 30 so that the display body 12 is opened and closed with respect to the main body 11.

<Tablet Opening/Closing Operation>

Figure 11A:
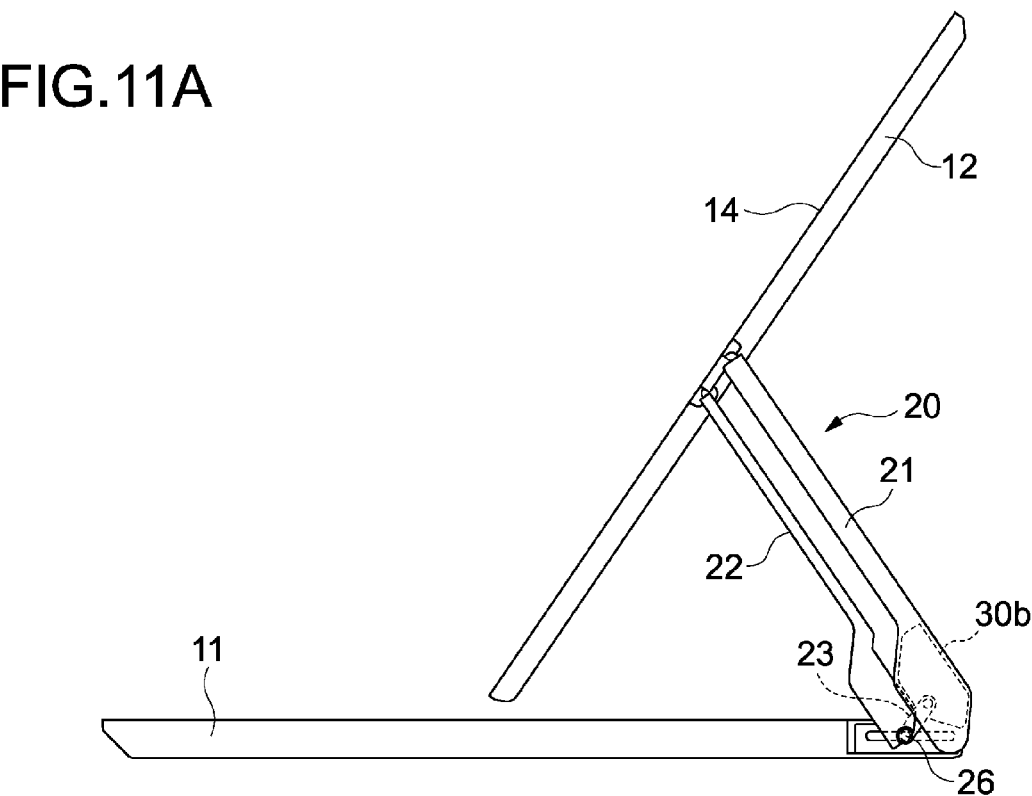
FIGS. 11A to 11C illustrate a tablet opening/closing operation.
Figure 11B:
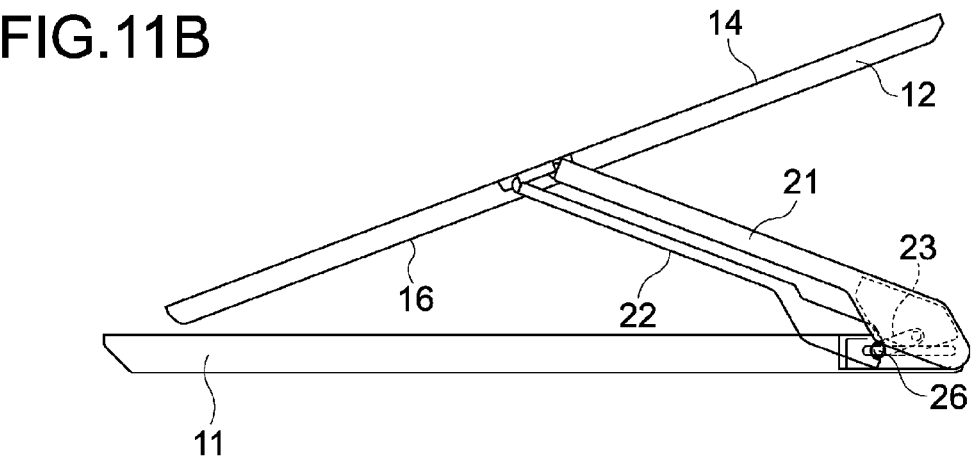
Figure 11C:
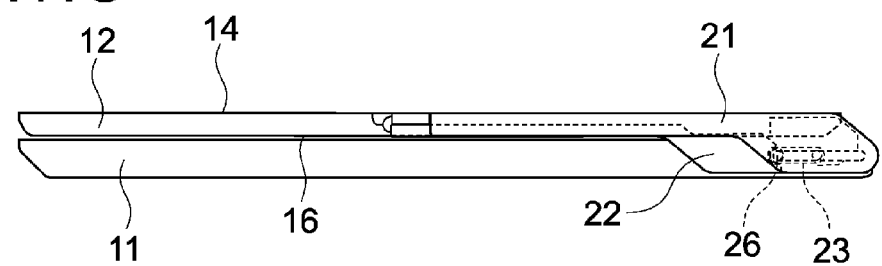

FIGS. 11A to 11C illustrate a tablet opening/closing operation. The tablet opening/closing operation refers to an operation of actuating the parallel linking mechanism 20 so that the display body 12 is moved relative to the main body 11. During the tablet opening/closing operation, the PC 100 enters a state (viewer mode described below) in which the display body 12 is within a range to be moved relative to the main body 11 between the clamshell mode and the tablet mode in a manner that an end portion of the display body 14 (edge portion parallel with the hinge shaft 30c, specifically, an upper edge portion or a lower edge portion) is moved toward and away from the hinge shaft 30c.

Figure 12A:
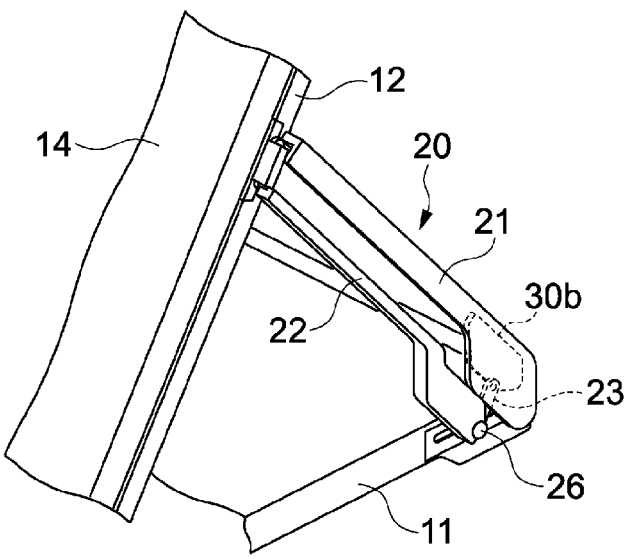
[FIG. 12] FIGS. 12A to 12C respectively illustrate motions of the parallel linking mechanism, which correspond respectively to operational timings in FIGS. 11A to 11C.
Figure 12B:
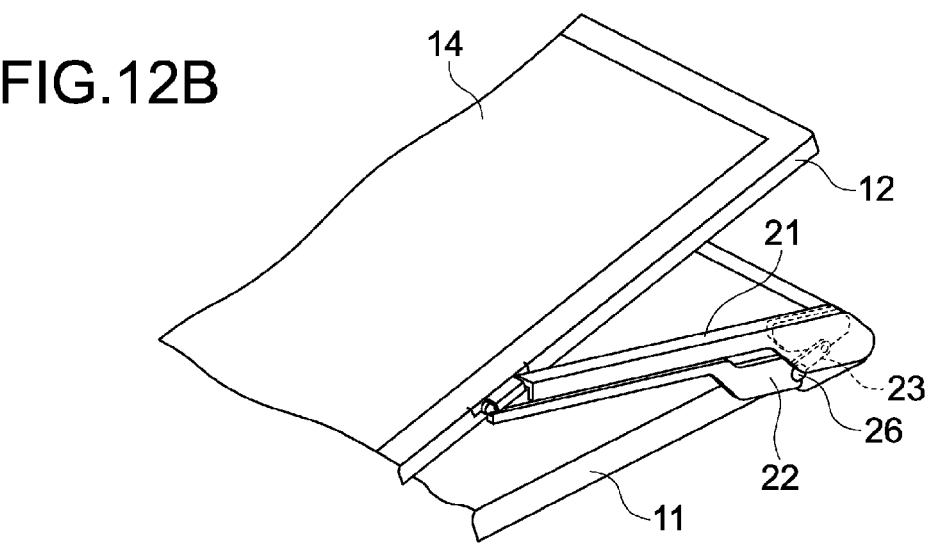
Figure 12C:
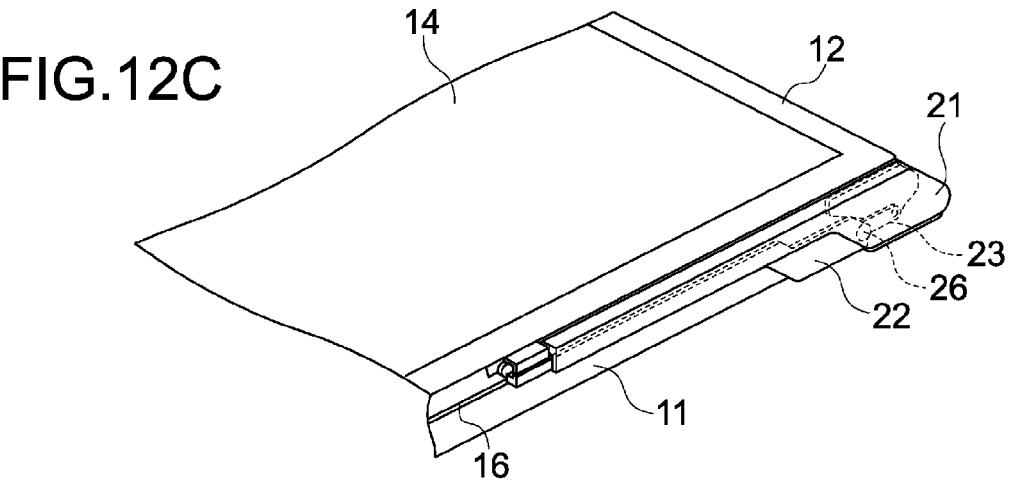
Figure 13:
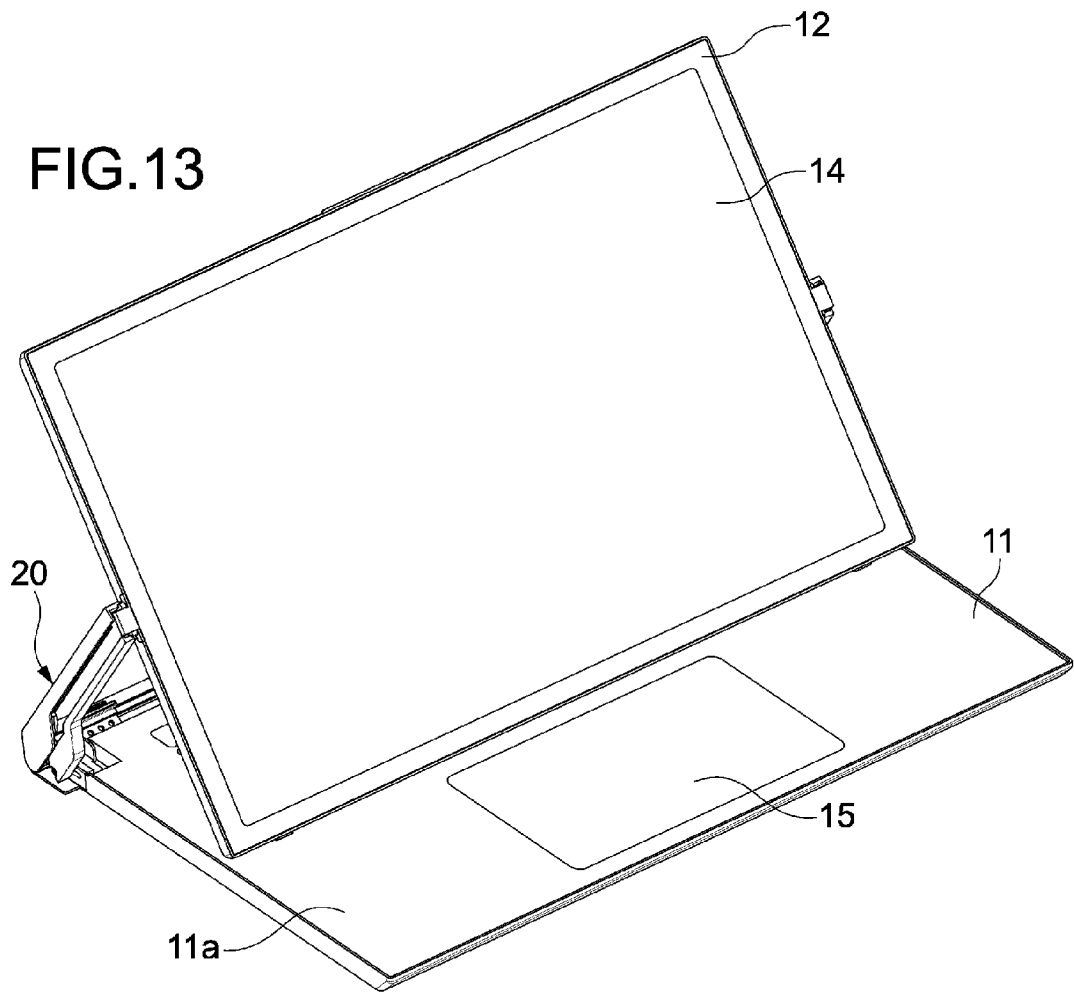
[FIG. 13]
Figure 15A:
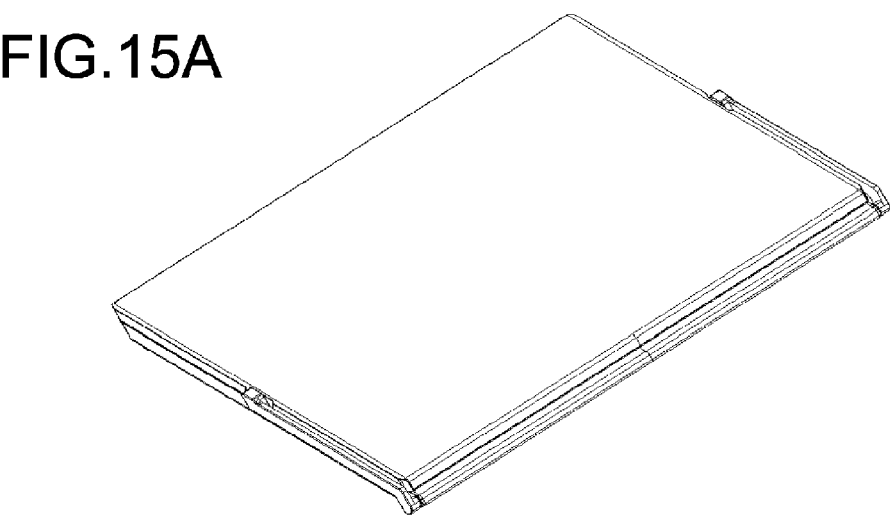
FIG. 15A is a perspective view viewed from diagonally right above the back of an information terminal apparatus (electronic computer) according to another embodiment of the present technology.
Figure 15B:
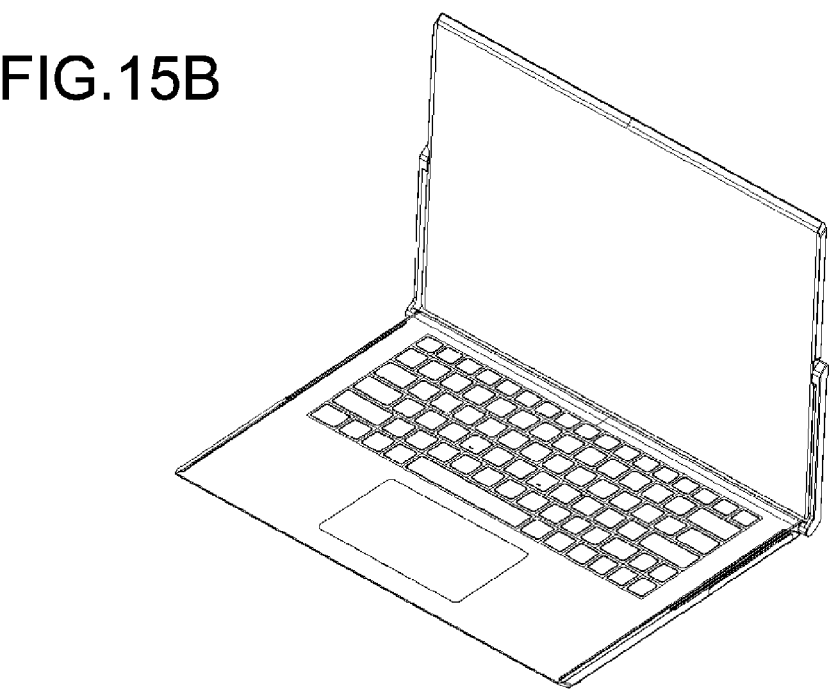
FIG. 15B is a perspective view viewed from diagonally right above the front of the information terminal apparatus, illustrating a state in which a display body (display unit) thereof is opened.
Figure 15C:
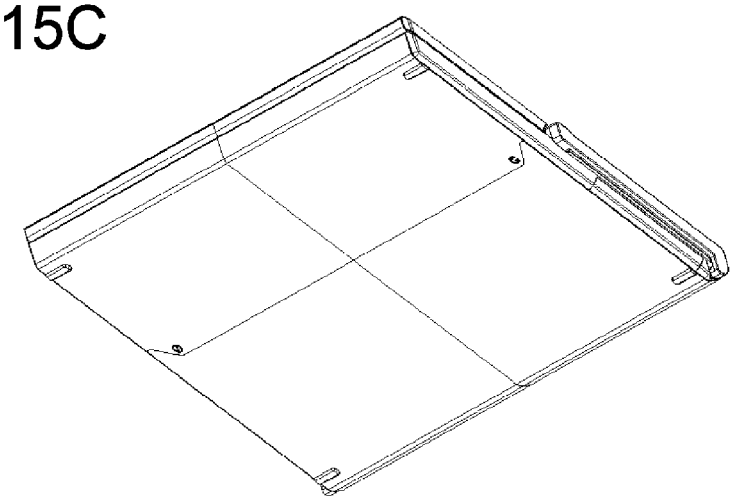
FIG. 15C is a perspective view viewed from a left bottom side on the back of the information terminal apparatus.
Figure 16A:
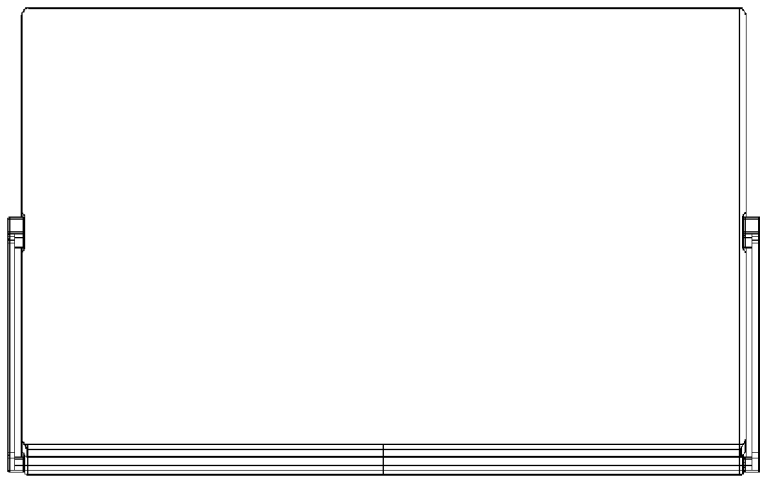
FIGS. 16A and 16B are respectively a plan view and a bottom view illustrating a state in which the electronic computer illustrated in FIG. 15 is closed (closed mode).
Figure 16B:
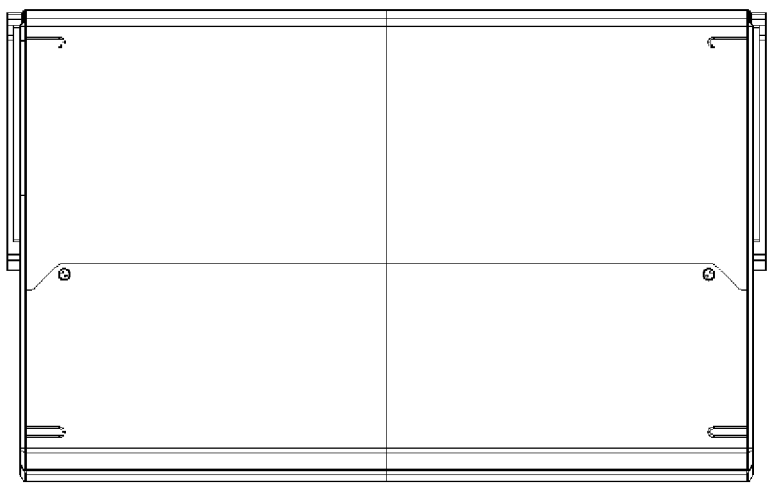
Figure 17A:
FIGS. 17A, 17B, and 17C are respectively a front view, a rear view, and a left side view of the electronic computer illustrated in FIG. 15. A right side view is laterally symmetrical with the left side view, and hence is not shown.
Figure 17B:
Figure 17C:
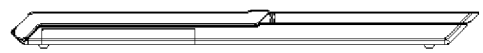
Figure 18A:
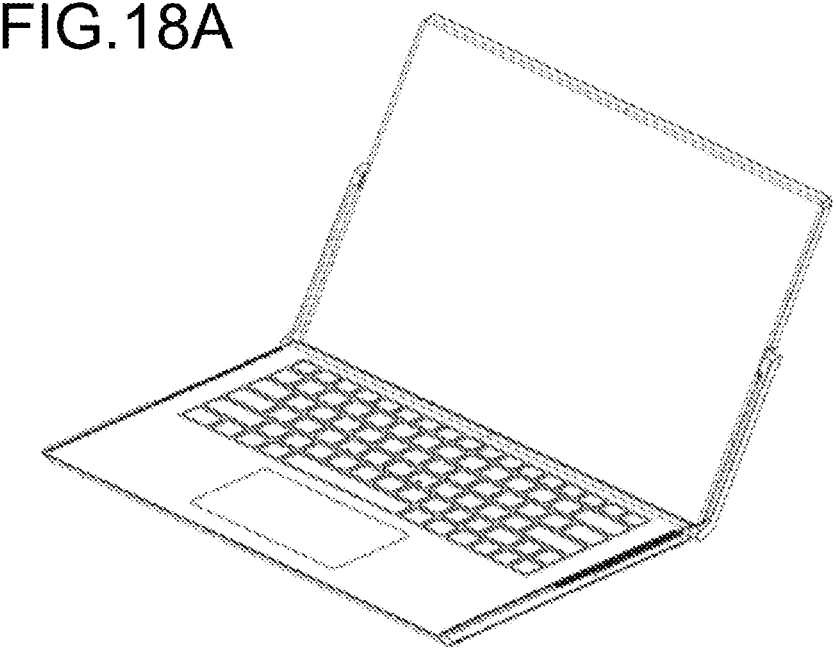
FIGS. 18A and 18B are respectively a perspective view viewed from diagonally right above the front of the electronic computer illustrated in FIG. 15 and a perspective view viewed from diagonally right above the back of the same, each illustrating a state in which the display body of the electronic computer illustrated in FIG. 15 is opened (state in a posture at an angle other than that in FIG. 15B).
Figure 18B:
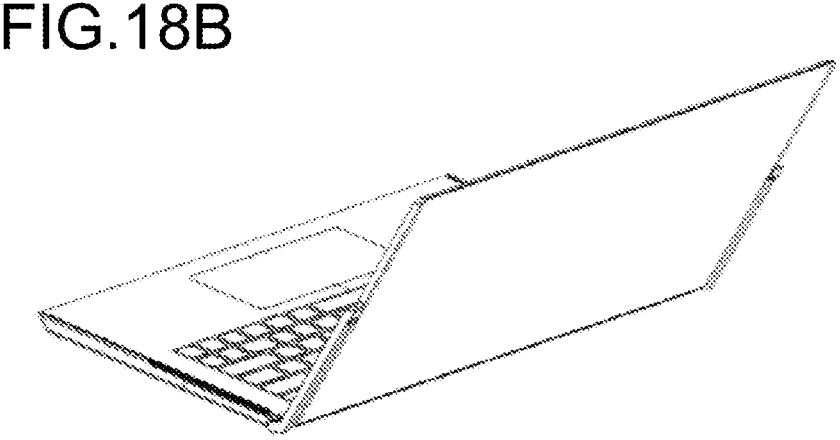
Figure 19A:
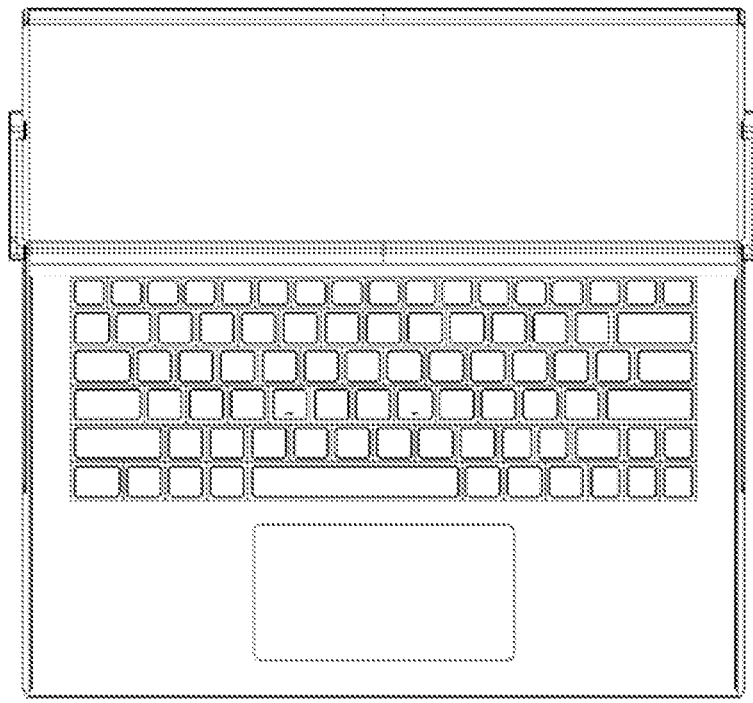
FIGS. 19A and 19B are respectively a plan view and a bottom view of the electronic computer, in each of which the display body is in the posture state illustrated in FIG. 18.
Figure 19B:
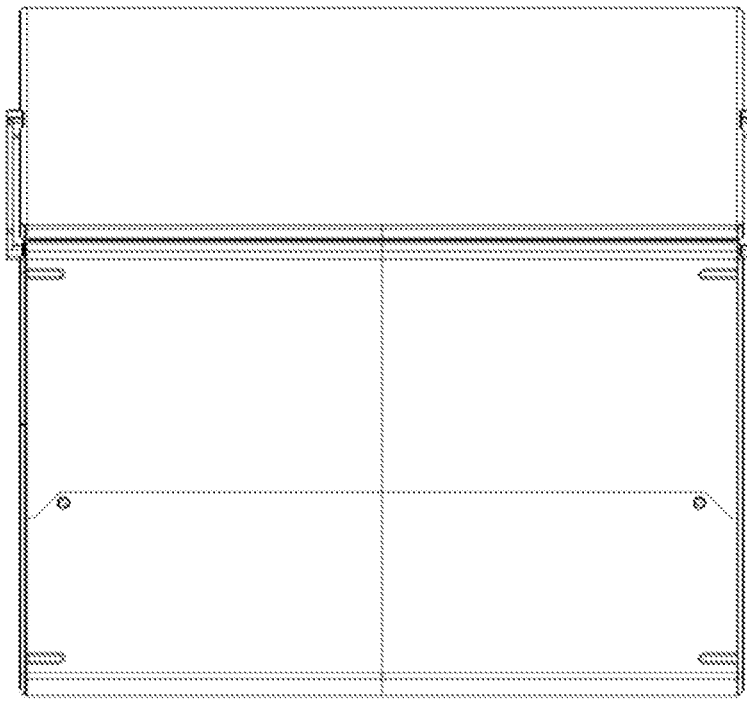
Figure 20A:
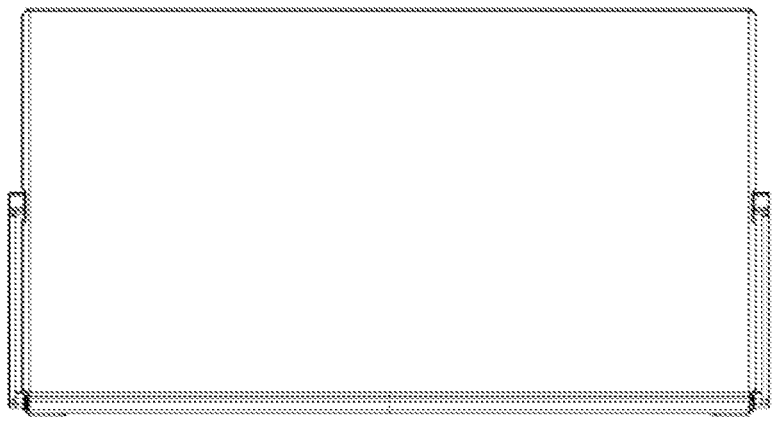
FIGS. 20A, 20B, and 20C are respectively a front view, a rear view, and a left side view of the electronic computer, in each of which the display body is in the posture state illustrated in FIG. 18. A right side view is laterally symmetrical with the left side view, and hence is not shown.
Figure 20B:
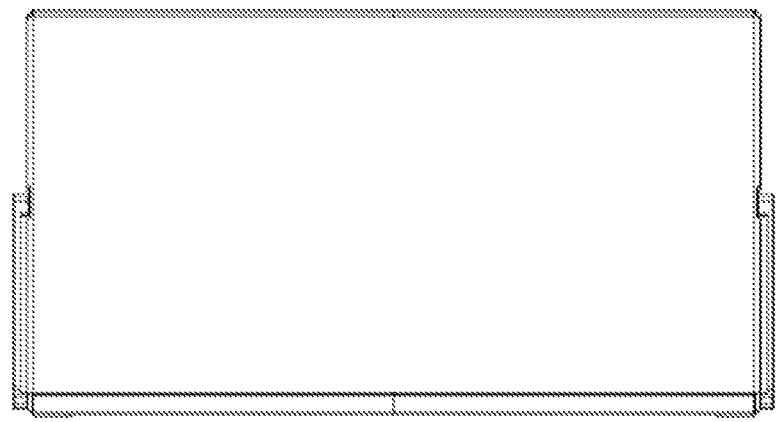
Figure 20C:
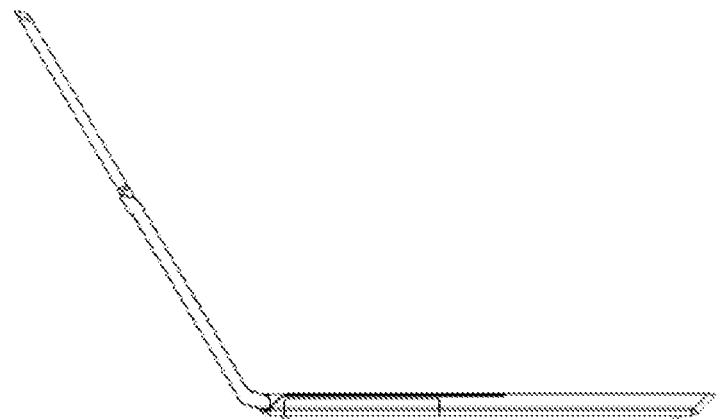
Figure 21A:
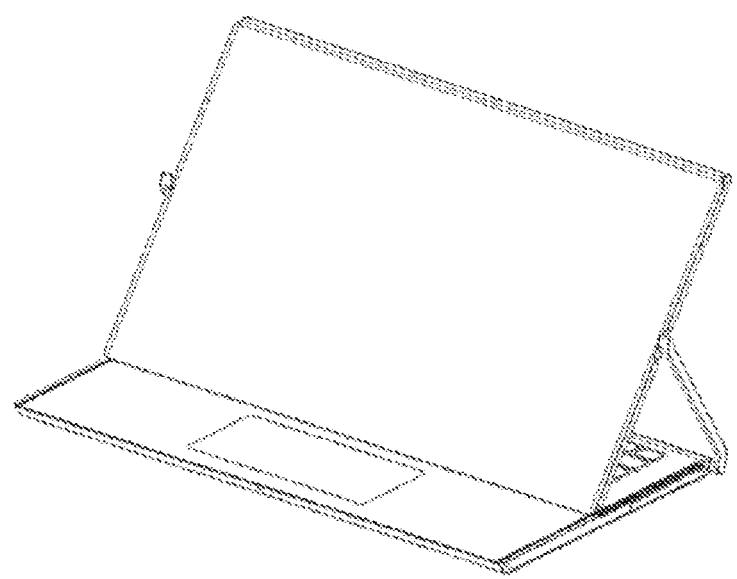
FIGS. 21A and 21B are respectively a perspective view viewed from diagonally right above the front of the electronic computer illustrated in FIG. 15 and a perspective view viewed from diagonally right above the back of the same, in each of which the display body of the electronic computer is in another mode (viewer mode).
Figure 21B:
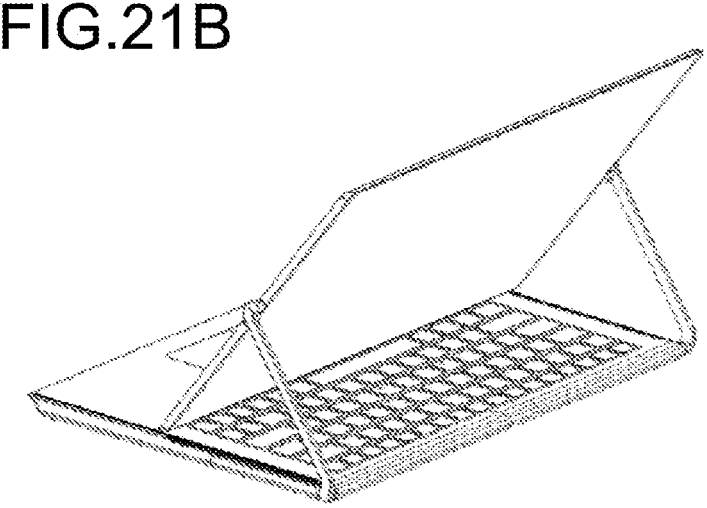
Figure 22A:
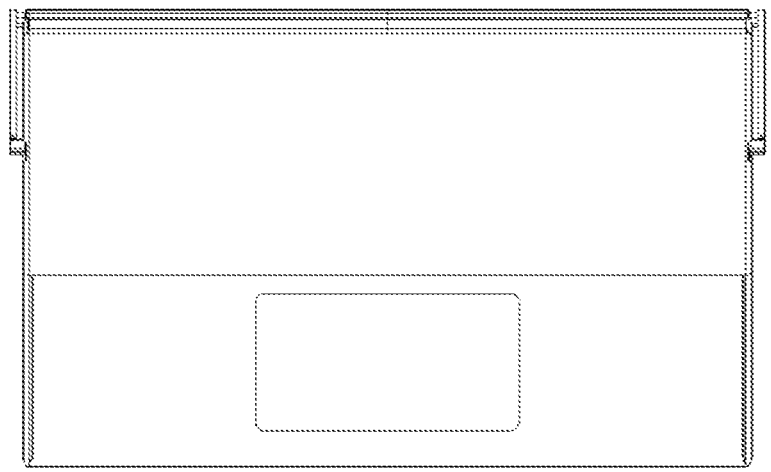
FIGS. 22A and 22B are respectively a plan view and a bottom view of the electronic computer, in each of which the display body is in the posture state illustrated in FIG. 21.
Figure 22B:
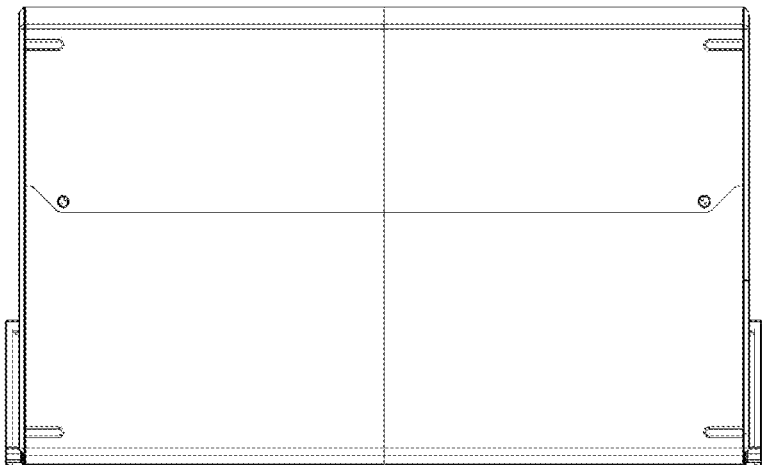
Figure 23A:
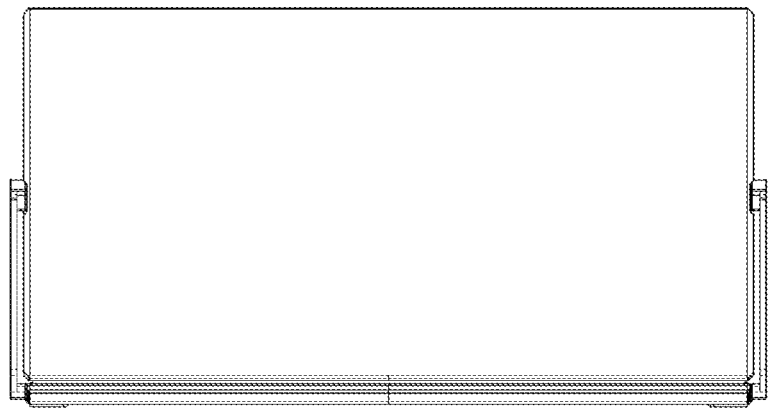
FIGS. 23A, 23B, and 23C are respectively a front view, a rear view, and a left side view of the electronic computer, in each of which the display body is in the posture state illustrated in FIG. 21. A right side view is laterally symmetrical with the left side view, and hence is not shown.
Figure 23B:
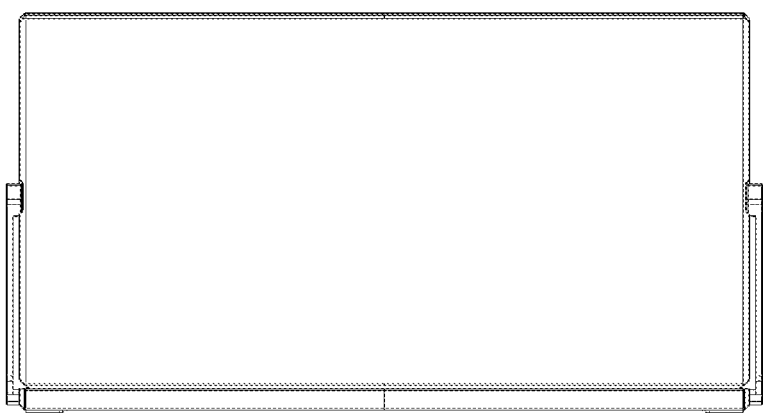
Figure 23C:
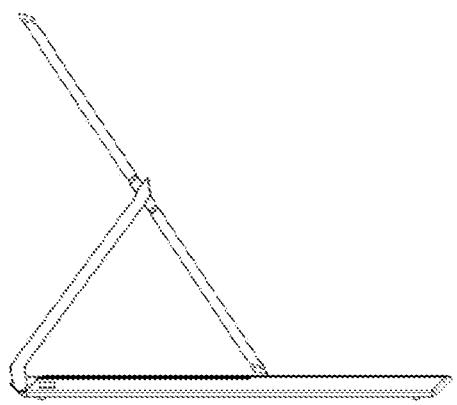
Figure 24:
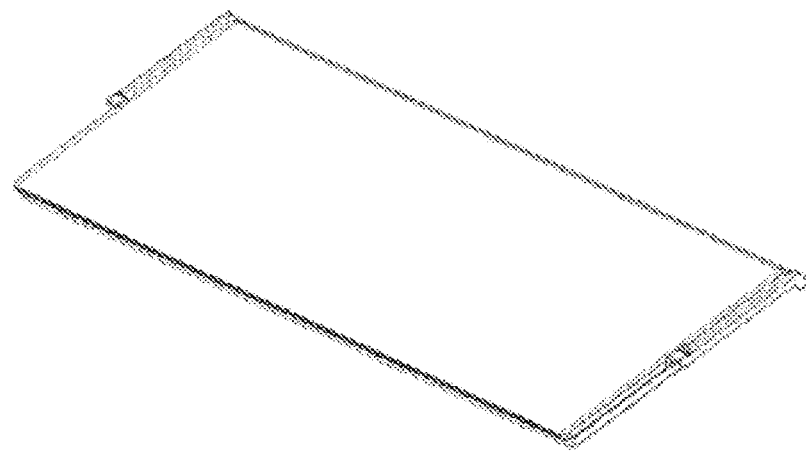
[FIG. 24]

FIGS. 12A to 12C respectively illustrate motions of the parallel linking mechanism 20, which correspond respectively to operational timings in FIGS. 11A to 11C. FIG. 13 is a perspective view of the PC 100 in the state illustrated in FIG. 11A.

For example, as illustrated in FIG. 1, under the state in which the display body 12 stands upright along a Z-axis direction (state at 90 deg), a user can start the tablet opening/closing operation. Further, the user can actuate the parallel linking mechanism 20 so that the PC 100 in the tablet mode illustrated in FIG. 11C enters the state in which the display body 12 stands upright along the Z-axis direction.

In the state illustrated in FIG. 1, as described above, the slide shaft 26 is aligned with the hinge shaft 30c. In the state illustrated in FIG. 1, when the parallel linking mechanism 20 is actuated, the slide shaft 26 is moved toward the slide front end 40e of the guide portion 40b, and the display body 12 is turned so that the display surface of the display unit 14 of the display body 12 is directed to an opposite side with respect to the main body 11, in other words, to an upper side. Motions of the PC 100 during this operation are sequentially illustrated in FIGS. 11A to 11C and correspondingly to FIGS. 12A to 12C. The state illustrated in FIG. 11B and FIG. 12B corresponds to the state illustrated in FIG. 7.

The states of the PC 100 illustrated in FIGS. 11C and 12C each correspond to the state illustrated in FIG. 5. In this state, the main body 11 and the display body 12 are overlaid on each other in a manner that a surface (opposite surface) 16 on an opposite side with respect to the display side on which the display unit 14 of the display body 12 is provided faces the main body 11. In other words, the display surface of the display unit 14 is directed upward, and the user can use the PC 100 in this state as a tablet PC.

As described above, according to this embodiment, the PC 100 can be used in at least the clamshell mode as illustrated in FIG. 9 and the tablet mode as illustrated in FIG. 3. The main body 11 and the display body 12 are connected to each other with the parallel linking mechanism 20, and hence the display body 12 can move relative to the main body 11 in accordance with a movement of the parallel linking mechanism 20. In other words, the posture of the display body 12 is determined in accordance with the angles of the arms 21 and 22 of the parallel linking mechanism 20, and hence the posture of the display body 12 can be stabilized.

Meanwhile, in the apparatus described in Patent Literature 1, the second chassis is turned by 360 deg or more, and hence it is difficult to assume a stable posture.

In the parallel linking mechanism 20 according to this embodiment, the slide shaft 26 of the link arm 23 slides along the guide portion 40b. With this, the parallel linking mechanism 20 can be actuated while stabilizing the posture of the display body 12 with respect to the main body 11.

The parallel linking mechanism 20 in lateral pairs are moved integrally with the rotary base frame 30 while being fixed thereto. With this, movements of the parallel linking mechanisms 20 in lateral pairs are more easily synchronized with each other, and rigidities thereof (rigidities of both the first arms 21) can be enhanced. As a result, motions of the display body 12 are further stabilized.

In this embodiment, the rotary base frame 30 having a function to couple both the parallel linking mechanisms 20 to each other includes the hinge shaft 30c, and hence it is unnecessary to provide a rotary shaft as a separate member. As a result, the PC 100 can be downsized while enhancing rigidities of both the first arms 21 of the parallel linking mechanisms 20.

As described above in this embodiment, the torque (frictional force) of the four shafts (slide shaft 26, connecting shaft 25, and shaft portions 27 and 28) of the parallel linking mechanism 20 is high enough to maintain the display body 12 in any posture with respect to the main body 11. However, this should not be construed restrictively. Specifically, it is not necessary for the PC 100 to maintain the posture of the display body 12 (posture illustrated in FIGS. 6 and 13) only with the torque of these four shafts while the user is moving the display body 12 as illustrated in FIGS. 6 and 13. In such a case, the PC 100 may further include another regulating member (not shown) configured to regulate movements of the display body 12 and the main body 11 so that movements of the display body 12 and the main body 11 can be regulated with torque other than that of the above-mentioned four shafts 25 to 28 in any of the postures in a tablet opened/closed state of the PC 100.

As such a regulating member, a member (or mechanism) having a high friction coefficient, such as rubber, is provided to, for example, at least one of the lower end portion of the display body 12 and an opposed surface (surface facing the display body 12, that is, an upper surface) 11a (refer to FIG. 13) of the main body 11. When being provided to the opposed surface 11a of the main body 11, this regulating member only has to be arranged in any other region than a region in which the keyboard 13 and the touch pad 15 are arranged. As an implementation of the member having a high friction coefficient, a part or the whole of the main body 11 may be processed to have a high friction coefficient.

Alternatively, as the regulating member, a mechanical or magnetic stopper may be provided to at least one of the lower end portion of the display body 12 and the opposed surface 11a of the main body 11.

Examples of the mechanical stopper include a projecting portion, a recessed portion, a cutout, and a sliding mechanism. The sliding mechanism refers, for example, to a mechanism configured to change an angle of the display body 12 at a plurality of different stages.

The magnetic stopper may be used in the following implementation: a permanent magnet may be provided, for example, at a predetermined position on the display body 12 (or on main body 11) so that the posture of the display body 12 can be maintained, for example, at the position as illustrated in FIGS. 6 and 13 while a ferromagnetic body is provided at a corresponding predetermined position on the main body 11 (or on display body 12).

(Electrical Hardware Configuration of Information Terminal Apparatus)

FIG. 14 is a block diagram showing an electrical hardware configuration of the PC 100.

In the PC 100, a CPU 101, a ROM 102 (read only memory) 102, and a RAM (random access memory) 103 are connected to each other via a bus 104. The CPU 101 mainly functions as a control unit.

An input/output interface 105 is further connected to the bus 104. An input unit 107 such as the keyboard 13, the touch pad 15, and a touch panel of the display unit 14 is connected to the input/output interface 105. Further, a storage unit 108, a communication unit 109, a drive unit 110 configured to drive removable media, and the like are connected to the input/output interface 105. In addition, a detection unit 111 described below is connected to the bus 104.

In the computer configured as described above, software is activated as follows: the CPU 101 loads software stored, for example, in the storage unit 108 into the RAM 103 via the input/output interface 105 and the bus 104, and then executes the software.

(Modes of Software Applied to Information Terminal Apparatus)

The PC 100 as the information terminal apparatus can be switched basically among the following four modes.

(1) Closed mode (first mode) (refer to FIG. 2)
(2) Clamshell mode (second mode) (refer to FIGS. 1 and 9)
(3) Tablet mode (third mode) (refer to FIG. 3)
(4) Viewer mode (fourth mode) (refer, for example, to FIGS. 11A and 13)

The viewer mode refers to a mode to be used mainly for enabling a user to view (browse) the display unit 14 of the display body 12 rather than to perform operation inputs to the PC 100. The viewer mode is used, for example, at the time when the user views movies, television programs, and other images (including moving images and still images) displayed on the display unit 14.

In the viewer mode, as illustrated, for example, in FIG. 13, as viewed in the Z-axis direction, the display body 12 hides the keyboard 13 while exposing the touch pad 15. However, the viewer mode is defined as a mode in which the display body 12 assumes any posture, such as a posture in which the display body 12 forms a predetermined angle with respect to the main body 11, or a posture in which the display body 12 forms an angle selected and set by the user with respect to the same under a state in which the tablet opening/closing operation can be performed.

As a matter of course, as described below, even in the viewer mode, the PC 100 may accept operation inputs from the user at least via the touch pad 15 and the like.

The CPU 101 may detect, through intermediation of the detection unit 111, in which of the above-mentioned modes (1) to (4) the PC 100 is used (in other words, confirm whether the PC 100 is used in at least one of these modes), and activate or switch software modules in accordance with the mode thus detected of the PC 100.

For example, the CPU 101 may detect in which of the above-mentioned modes (2) to (4) the PC 100 is used, and activate or switch the software modules in accordance with the mode thus detected of the PC 100. Alternatively, the CPU 101 may detect in which of the above-mentioned modes (2) and (3) the PC 100 is used, and activate or switch the software modules in accordance with the mode thus detected of the PC 100. Still alternatively, the CPU 101 may detect in which of the above-mentioned modes (3) and (4) the PC 100 is used, and activate or switch the software modules in accordance with the mode thus detected of the PC 100.

The "switching" herein conceptually includes "activation" of software. The "switching" includes not only the "activation" but also a process of reactivating software that has been already activated and deactivated thereafter so that the CPU can execute a program of the software.

For example, when a plurality of modes of the above-mentioned four modes are detected, it suffices that the storage unit 108 stores a plurality of software modules and information items associated therewith, which respectively indicate the plurality of modes of the above-mentioned four modes of the PC 100. With this, the PC 100 can activate a software module selected in accordance with a mode of the PC 100.

The software may include an OS (operating system), or application software operated on the OS. For example, under a state in which the PC 100 is used in the clamshell mode on a first OS that has already been activated, when the user switches the PC 100 into the tablet mode, a second OS other than the first OS is activated. In other words, the PC 100 is used in a dual-boot mode. As a matter of course, such an example should not be construed restrictively, and the PC 100 may switch three or more OSs in accordance with modes. For example, there may be employed the combination of Windows (trademark) as the first OS, Android (trademark) as the second OS, and iOS (trademark) as a third OS.

Alternatively, in accordance with modes, the PC 100 may switch different user interfaces (UI) within one OS. For example, when Windows (trademark) 8 is used as the one OS, the PC 100 may use a normal UI in the clamshell mode while using Metro UI in the tablet mode.

Still alternatively, software modules to be switched are not limited to OSs, and may include applications.

For example, when the clamshell mode or the tablet mode of the PC 100 is switched to the viewer mode, the PC 100 can automatically activate an application configured to reproduce moving images.

Yet alternatively, there may be employed an application configured to perform setting of assignment (allocation) of operation inputs with respect to a partial region or the whole of the screen of the display unit 14 in the viewer mode. This application displays an operation screen for touch operation inputs through intermediation of the display unit 14 in the partial region or the whole of the screen of the display unit 14 in the viewer mode. The operation screen includes an operation screen for reproduction of moving images. For example, the operation screen is divided into a plurality of (for example, three or more) regions: a right side region for fast-forward play; a central region for reproduction and stop; and a left side region for fast rewind.

As an example of another application, the PC 100 may include an application configured to switch enabling and disabling of touch operation inputs through intermediation of the display unit 14 in accordance with the mode of the PC 100. For example, the PC 100 may enable touch operation inputs when the PC 100 is used in the tablet mode and disable the touch operation inputs when the PC 100 is used in other modes. With this, only when the PC 100 is used in the tablet mode, the user can perform touch operation inputs through intermediation of the display unit 14. Thus, the command corresponding to touch operation input depends on the mode. That is, in a first mode a touch operation input may correspond to a first command, while in a second mode the same touch operation input may correspond to a different command than the first command.

Yet alternatively, in accordance with the mode of the PC 100, the PC 100 may switch enabling and disabling of not only the touch operation inputs through intermediation of the display unit 14 but also operation inputs through intermediation of the keyboard 13, the touch pad 15, or the like.

In this context, the detection unit 111 may be configured to detect differences between the above-mentioned modes of the PC 100, for example, with magnetism or electricity. When the detection unit 111 performs detection with magnetism, it suffices that a magnetic sensor and a permanent magnet are arranged respectively on the first arm 21 and the second arm 22 of the parallel linking mechanism 20. Meanwhile, when the detection unit 111 performs detection with electricity, it suffices that electrically conductive portions are provided to any pair of members of the parallel linking mechanism 20.

For example, there may be employed a mechanism for detecting whether the PC 100 is used in the viewer mode or the other modes, in which the permanent magnet is arranged on the main body 11 (or lower end portion of the display body 12) while the magnetic sensor is arranged on the lower end portion of the display body 12 (or main body 11).

(Other embodiments)

The present technology is not limited to the embodiment described hereinabove, and may be carried in various other embodiments.

In addition to the display unit 14 of the display body 12, another display unit may be provided to the main body 11. In that case, it is not necessary for the main body 11 to include the keyboard 13 as hardware, and it suffices that only one of the keyboard 13 and the touch pad 15 is provided on the opposed surface 11a (upper surface) of the main body 11.

Alternatively, the PC 100 may be configured such that the keyboard 13 is provided on a front side of the main body 11 while the touch pad 15 is provide on a rear side thereof.

The information terminal apparatus may have a function of a mobile phone or the like. In that case, a size of the information terminal apparatus can be appropriately changed.

In the parallel linking mechanism 20, it is not necessary that a shaft configured to connect the link arm 23 and the second arm 22 to each other (corresponding to the slide shaft 26 in the embodiment described above) be connected to the main body 11 so that the parallel linking mechanism 20 is freely movable in a Z-Y plane.

FIGS. 15 to 24 illustrate an information terminal apparatus (electronic computer) according to another embodiment of the present technology, in which a parallel linking mechanism is used.

At least two of the features of the embodiments described above may be combined with each other.

The present technology may employ configurations as follows.

(1) An apparatus including:
a first body including an input unit on an input side of the first body;
a second body including a display on a display side of the second body; and
a linking mechanism configured to link the first body and the second body such that the first body and the second body can be switched between four different modes, a first mode being where the first body and second body are arranged parallel to each other with the input side facing an opposite side of the second body from the display side, a second mode where the first body and the second body are arranged parallel to each other with the input side facing the display side, a third mode where the second body is rotated around a back edge of the first body and the display side faces the input side, and a fourth mode where the second body is arranged above the input side of the first body such that an edge of the second body is adjacent to a portion of the input side of the first body between a front edge and the back edge of the first body.

(2) The apparatus according to (1), further comprising:
a detection unit configured to detect if the apparatus is in the first mode, the second mode, the third mode, or the fourth mode.

(3) The apparatus according to (2), further comprising:
a processor configured to activate or switch software modules in accordance with a mode detected by the detection unit.

(4) The apparatus according to (3), wherein the software modules include an operating system and application software operated by the operating system.

(5) The apparatus according to (1), wherein the apparatus activates a first operating system in the second mode, and the apparatus activates a second operating system different than the first operating system when the mode is changed to the third mode.

(6) The apparatus according to (3), wherein the processor switches a user interface when the mode is changed while maintaining a same operating system.

(7) The apparatus according to (3), wherein the processor activates a Windows operating system, and the processor uses a normal user interface in the second mode, and the processor uses a Metro user interface in the third mode.

(8) The apparatus according to (1), wherein the apparatus activates a application configured to reproduce moving images when the apparatus is changed from the second mode or the third mode to the fourth mode.

(9) The apparatus according to (1), wherein the apparatus assigns a partial region or an entire region of the display unit to receive a touch operation input in the fourth mode.

(10) The apparatus according to (9), wherein the apparatus assigns a first partial region of the display unit to receive a fast-forward touch operation input, a second partial region of the display unit to receive a start and stop touch operation input, and a third partial region of the display unit to receive a rewind touch operation input in the fourth mode.

(11) The apparatus according to (3), wherein the processor switches between enabling and disabling of touch operation inputs received through the display unit based on the mode detected by the detection unit.

(12) The apparatus according to (3), wherein the processor executes a command corresponding to a touch operation input received through the display unit based on the mode detected by the detection unit.

(13) The apparatus according to (12), wherein the processor executes a first command corresponding to a touch operation input received through the display unit in the first mode, and the processor executes a second command corresponding to the touch operation input received in the second mode, a second command being different than the first command.

(14) The apparatus according to (3), wherein the processor switches between enabling and disabling of operation inputs received through the input unit based on the mode detected by the detection unit.

(15) The apparatus according to (14), wherein the input unit includes a keyboard and a touchpad, and the processor switches between enabling and disabling of operation inputs received through the keyboard and the touchpad based on the mode detected by the detection unit.

(16) The apparatus according to (1) to (15), wherein the linking mechanism includes a first linking mechanism on a first side of the apparatus and a second linking mechanism on an opposite side of the apparatus as the first linking mechanism.

(17) The apparatus according to (1) to (16), wherein the linking mechanism includes a first arm, a second arm, and a link arm configured to link the first arm and the second arm in parallel with each other.

(18) The apparatus according to (16), wherein a first end of the link arm is rotatably connected to a first end of the first arm with a first connecting shaft, and a second end of the link arm is rotatably connected to a first end of the second arm with a second connecting shaft.

(19) The apparatus according to (18), wherein the second connecting shaft extends into a slot in the first body, and the second connecting shaft slides along the slot when the apparatus changes between modes.

(20) The apparatus according to (18), wherein a second end of the first arm is rotatably connected to the second body with a third connecting shaft, and a second end of the second arm is rotatably connected to the second body with a fourth connecting shaft.

(21) An information terminal apparatus, including:
a first body;
a second body having a display side and an opposite side with respect to the display side;

a hinge shaft configured to connect the first body and the second body turnably to each other; and a connecting member configured to connect the first body and the second body to each other so that the information terminal apparatus is used in modes of relative posture modes of the first body and the second body, the modes including a first mode in which the first body and the second body are overlaid on each other in a manner that the opposite side is directed to an outside of the information terminal apparatus, a second mode which is a mode of the information terminal apparatus, in which the second body in the first mode is within a range to be moved by turning about the hinge shaft relative to the first body, a third mode in which the first body and the second body are overlaid on each other in a manner that the display side is directed to the outside of the information terminal apparatus, and a fourth mode which is a mode of the information terminal apparatus, in which the second body between the second mode and the third mode is within a range to be moved relative to the first body in a manner that an end portion of the second body moves toward and away from the hinge shaft.

(22) The information terminal apparatus according to Item (21), further including a detection unit configured to detect at least one of the first mode, the second mode, the third mode, and the fourth mode.

(23) The information terminal apparatus according to Item (22), further including:

a storage unit configured to store software; and a control unit configured to activate the software stored in the storage unit in accordance with the at least one of the first mode, the second mode, the third mode, and the fourth mode detected by the detection unit.

(24) The information terminal apparatus according to Item (22), in which the detection unit detects a plurality of modes of the first mode, the second mode, the third mode, and the fourth mode.

(25) The information terminal apparatus according to Item (24), further including:

a storage unit configured to store a plurality of software modules, and information items associated with the plurality of software modules, the information items respectively indicating the plurality of modes of the information terminal apparatus; and a control unit configured to activate, of the plurality of software modules, a software module corresponding to an information item indicating the at least one of the plurality of modes of the information terminal apparatus, the at least one of the plurality of modes having been detected by the detection unit.

(26) The information terminal apparatus according to any one of Items (21) to (25), in which the connecting member includes a parallel linking mechanism having a first arm turnable integrally with the hinge shaft and turnably connected to the second body, a second arm turnably connected to the second body, and a link arm configured to link the first arm and the second arm in parallel with each other.

(27) An information processing method, including:

detecting at least one of modes of relative posture modes of a first body and a second body of an information terminal apparatus; and activating a software module correspondingly to the detected at least one of the modes, the information terminal apparatus including the first body, the second body having a display side and an opposite side with respect to the display side, a hinge shaft configured to connect the first body and the second body turnably to each other, and a connecting member configured to connect the first body and the second body to each other, the modes including a first mode in which the first body and the second body are overlaid on each other in a manner that the opposite side is directed to an outside of the information terminal apparatus, a second mode which is a mode of the information terminal apparatus, in which the second body in the first mode is within a range to be moved by turning about the hinge shaft relative to the first body, a third mode in which the first body and the second body are overlaid on each other in a manner that the display side is directed to the outside of the information terminal apparatus, and a fourth mode which is a mode of the information terminal apparatus, in which the second body between the second mode and the third mode is within a range to be moved relative to the first body in a manner that an end portion of the second body moves toward and away from the hinge shaft.

The present application contains subject matter related to that disclosed in Japanese Priority Patent Application JP 2012-022540 filed in the Japan Patent Office on Feb. 3, 2012, the entire content of which is hereby incorporated by reference. It should be understood by those skilled in the art that various modifications, combinations, sub-combinations and alterations may occur depending on design requirements and other factors insofar as they are within the scope of the appended claims or the equivalents thereof.

REFERENCE SIGNS LIST 11 main body
12 display body
14 display unit
20 parallel linking mechanism
21 first arm
22 second arm
23 link arm
30c hinge shaft
100 PC (information terminal apparatus)
101 CPU
108 storage unit

The invention claimed is:

1. An apparatus comprising: a first body including an input unit on an input side of the first body; a second body including a display on a display side of the second body; and a linking mechanism configured to link the first body and the second body such that the first body and the second body can be switched between four different modes, a first mode being where the first body and second body are arranged parallel to each other with the input side facing an opposite side of the second body from the display side, a second mode where the first body and the second body are arranged parallel to each other with the input side facing the display side, a third mode where the second body is rotated around a back edge of the first body and the display side faces the input side, and a fourth mode where the second body is arranged above the input side of the first body such that an edge of the second body is adjacent to a portion of the input side of the first body between a front edge and the back edge of the first body; wherein the linking mechanism includes a first linking mechanism on a first side of the apparatus and a second linking mechanism on an opposite side of the apparatus as the first linking mechanism; wherein a first end of the link arm is rotatably connected to a first end of the first arm with a first connecting shaft, and a second end of the link arm is rotatably connected to a first end of the second arm with a second connecting shaft; and wherein the second connecting shaft extends into a slot in the first body, and the second connecting shaft slides along the slot when the apparatus changes between modes.

2. The apparatus according to claim 1, further comprising:
a detection unit configured to detect if the apparatus is in the first mode, the second mode, the third mode, or the fourth mode.

3. The apparatus according to claim 2, further comprising:
a processor configured to activate or switch software modules in accordance with a mode detected by the detection unit.

4. The apparatus according to claim 3, wherein the software modules include an operating system and application software operated by the operating system.

5. The apparatus according to claim 3, wherein the processor switches a user interface when the mode is changed while maintaining a same operating system.

6. The apparatus according to claim 3, wherein the processor activates a Windows operating system, and the processor uses a normal user interface in the second mode, and the processor uses a Metro user interface in the third mode.

7. The apparatus according to claim 3, wherein the processor switches between enabling and disabling of touch operation inputs received through the display unit based on the mode detected by the detection unit.

8. The apparatus according to claim 3, wherein the processor executes a command corresponding to a touch operation input received through the display unit based on the mode detected by the detection unit.

9. The apparatus according to claim 8, wherein the processor executes a first command corresponding to a touch operation input received through the display unit in the first mode, and the processor executes a second command corresponding to the touch operation input received in the second mode, a second command being different than the first command.

10. The apparatus according to claim 3, wherein the processor switches between enabling and disabling of operation inputs received through the input unit based on the mode detected by the detection unit.

11. The apparatus according to claim 10, wherein the input unit includes a keyboard and a touchpad, and the processor switches between enabling and disabling of operation inputs received through the keyboard and the touchpad based on the mode detected by the detection unit.

12. The apparatus according to claim 1, wherein the apparatus activates a first operating system in the second mode, and the apparatus activates a second operating system different than the first operating system when the mode is changed to the third mode.

13. The apparatus according to claim 1, wherein the apparatus activates a application configured to reproduce moving images when the apparatus is changed from the second mode or the third mode to the fourth mode.

14. The apparatus according to claim 1, wherein the apparatus assigns a partial region or an entire region of the display unit to receive a touch operation input in the fourth mode.

15. The apparatus according to claim 14, wherein the apparatus assigns a first partial region of the display unit to receive a fast-forward touch operation input, a second partial region of the display unit to receive a start and stop touch operation input, and a third partial region of the display unit to receive a rewind touch operation input in the fourth mode.

16. The apparatus according to claim 1, wherein the linking mechanism includes a first arm, a second arm, and a link arm configured to link the first arm and the second arm in parallel with each other.

17. The apparatus according to claim 1, wherein a second end of the first arm is rotatably connected to the second body with a third connecting shaft, and a second end of the second arm is rotatably connected to the second body with a fourth connecting shaft.

* * * * *